(12) United States Patent
Sugimoto et al.

(10) Patent No.: US 8,609,795 B2
(45) Date of Patent: Dec. 17, 2013

(54) WATER AND OIL REPELLENT COMPOSITION

(75) Inventors: Shuichiro Sugimoto, Yokohama (JP);
Minako Shimada, Yokohama (JP);
Toyomichi Shimada, Yokohama (JP);
Ryuji Seki, Yokohama (JP); Takashige Maekawa, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 1381 days.

(21) Appl. No.: 11/940,577

(22) Filed: Nov. 15, 2007

(65) Prior Publication Data

US 2008/0076862 A1   Mar. 27, 2008

Related U.S. Application Data

(60) Division of application No. 11/106,641, filed on Apr. 15, 2005, now abandoned, which is a continuation of application No. PCT/JP03/13195, filed on Oct. 15, 2003.

(30) Foreign Application Priority Data

Oct. 15, 2002   (JP) .................................. 2002-300325

(51) Int. Cl.
*C08F 118/00* (2006.01)

(52) U.S. Cl.
USPC ........... 526/245; 526/242; 524/529; 524/543; 524/554

(58) Field of Classification Search
USPC .................... 526/245, 242; 524/529, 543, 554
See application file for complete search history.

(56) References Cited

U.S. PATENT DOCUMENTS

| | | | |
|---|---|---|---|
| 3,282,905 A | 11/1966 | Fasick et al. | |
| 5,688,309 A | 11/1997 | Shimada et al. | |
| 6,096,827 A * | 8/2000 | Lee et al. | 525/72 |
| 6,177,531 B1 | 1/2001 | Shimada et al. | |
| 6,251,984 B1 | 6/2001 | Shimada et al. | |
| 6,376,592 B1 * | 4/2002 | Shimada et al. | 524/457 |
| 6,395,821 B1 | 5/2002 | Shimada et al. | |
| 6,590,035 B2 * | 7/2003 | Shimada et al. | 525/199 |
| 6,624,268 B1 | 9/2003 | Maekawa et al. | |
| 6,646,043 B2 | 11/2003 | Funaki et al. | |
| 6,653,376 B2 * | 11/2003 | Sugimoto et al. | 524/156 |
| 6,716,944 B2 * | 4/2004 | Maekawa et al. | 526/245 |
| 2004/0087695 A1 | 5/2004 | Sugimoto et al. | |

FOREIGN PATENT DOCUMENTS

| | | |
|---|---|---|
| DE | 100 27 745 | 12/2001 |
| EP | 0 094 057 A1 | 11/1983 |
| EP | 0 234 724 A1 | 9/1987 |
| GB | 933512 | 8/1963 |
| GB | 971732 | 10/1964 |
| GB | 1040035 | 8/1966 |
| JP | 62-179517 | 8/1987 |
| JP | 63-75082 | 4/1988 |
| JP | 1-153784 | 6/1989 |
| JP | 8-109580 | 4/1996 |
| JP | 10-81873 | 3/1998 |
| JP | 10-237133 | 9/1998 |
| JP | 2000-508360 | 7/2000 |
| JP | 7-173025 | 7/2005 |

OTHER PUBLICATIONS

U.S. Appl. No. 12/039,218, filed Feb. 28, 2008, Asada, et al.
U.S. Appl. No. 12/555,377, filed Sep. 8, 2009, Shimada, et al.
U.S. Appl. No. 12/570,893, filed Sep. 30, 2009, Shimada, et al.
U.S. Appl. No. 12/212,716, filed Sep. 18, 2008, Furuta, et al.
U.S. Appl. No. 12/958,013, filed Dec. 1, 2010, Hoshino.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

A water and oil repellent composition having excellent durability, which can impart excellent water and oil repellency to an object, even in a process at low temperatures, and which enables water and oil repellent treatment providing a soft hand. A water and oil repellent composition which comprises, as an essential component, a copolymer containing polymerization units of the following monomer (a) and polymerization units of the following monomer (b):

monomer (a): an $R^f$ group-containing monomer which forms a photopolymer having no melting point or a melting point of at most 55° C. attributable to fine crystals derived from the $R^f$ groups and having a glass transition point of at least 20° C.

monomer (b): a monomer having no $R^f$ group and having a cross-linkable functional group.

13 Claims, No Drawings

WATER AND OIL REPELLENT COMPOSITION

This is a divisional application of U.S. application Ser. No. 11/106,641, filed Apr. 15, 2005, which is a continuation of PCT/JP03/13195 filed on Oct. 15, 2003.

TECHNICAL FIELD

The present invention relates to a water and oil repellent composition. The water and oil repellent composition of the present invention can develop excellent water and oil repellent performance even in a process at low temperatures, and further, is excellent in durability to abrasion, washing, etc. which is required for some types of substrates, and therefore the initial water and oil repellency can be maintained.

BACKGROUND ART

As a technique for imparting water and oil repellency to the surface at the same time, it has been common to treat an object with an organic solvent solution or an aqueous dispersion of a polymer containing polymerization units of a polymerizable monomer containing a polyfluoroalkyl group (hereinafter, a polyfluoroalkyl group will be referred to as an $R^f$ group) in its molecule (hereinafter, such a monomer will be referred to also as an $R^f$ monomer) or a copolymer of such a polymerizable monomer with additional monomers (hereinafter such a polymer and a copolymer will be referred to also as $R^f$ group-containing polymers).

The development of such water and oil repellency is attributed to formation of "a low energy surface" having a low critical surface tension on the surface of a coating film by surface orientation of $R^f$ groups. It has been considered that in order to develop both water repellency and oil repellency, the orientation of $R^f$ groups on the surface is important, and in order to realize the surface orientation of $R^f$ groups, it is important that the polymer has a melting point attributable to fine crystals derived from $R^f$ groups. For this purpose, an $R^f$ group monomer which forms a homopolymer having a melting point attributable to fine crystals derived from $R^f$ groups (crystallizable $R^f$ group-containing monomer) has been used.

Compositions having a polymer containing polymerization units of such a crystallizable $R^f$ group-containing monomer (hereinafter, referred to also as a crystallizable polymer) as an active component achieve the purpose of developing water and oil repellency at most, and improvements have been made in other practical functions.

For example, durability against e.g. washing, dry cleaning and abrasion has been improved by using a monomer which provides high hardness or a monomer having a crosslinkable reactive group in addition to the crystallizable $R^f$ group-containing monomer, or by blending the resulting copolymer with a polymer capable of forming strong coating films.

Further, investigations for softening the hard hand and lowering the melting point of $R^f$ groups in order to develop the water repellency under low-temperature curing conditions, have been made. For example, it is known to copolymerize a monomer containing a perfluoroalkyl group (hereinafter, a perfluoroalkyl group will be referred to as an $R^F$ group) having widely ranging chain lengths with an alkyl group-containing monomer. Further, use of a silicone containing an $R^F$ group having widely ranging chain lengths is also known.

For example, a cosmetic composition containing a fluorine type compound and a wax having a specific melting point (for example, JP-A-7-173025), a tetrapolymer comprising an $R^F$ group-containing (meth)acrylate, stearyl (meth)acrylate and other two types of monomers as essential components (for example, JP-A-10-237133), a mixture of a fluorine type water and oil repellent with an alcohol containing an $R^F$ group having a specific chain length or a perfluoropolyether group-containing alcohol (for example, JP-A-10-81873), and a reaction product of an amino group-containing silicone and an $R^f$ group-containing ester compound (for example, JP-A-8-109580) are known.

Meanwhile, as an example using an $R^f$ group-containing monomer having a limited chain length, an acryl type heptapolymer having $R^F$ groups with a specified chain length distribution (for example, JP-A-62-179517) may be mentioned. It contains at least 40% of crystallizable $R^f$ group-containing monomers.

The techniques in this field used in these known art references have improved physical properties from a viewpoint of functions required in addition to water and oil repellency, without impairing the water repellency and oil repellency attributable to $R^f$ groups. However, since an $R^f$ group-containing crystallizable polymer is used as the main component, the following demerits resulting therefrom have not been fundamentally overcome.

In conventional water and oil repellents, in order to impart water and oil repellency, it has been considered essential to use a crystallizable $R^f$ group-containing monomer which has an $R^f$ group capable of forming fine crystals having a high melting point (usually at least 70° C.), among crystallizable $R^f$ group-containing monomers.

However, if a crystallizable $R^f$ group-containing monomer is used, the entire polymer will have high crystallinity attributable thereto, and accordingly, an object coated or treated with such a polymer becomes very hard. For example, intrinsically soft fiber products may lose their soft hand, and since the coating film is hard and brittle, defects such as hand marks and chalk marks formed during handling the object tends to remain on raw fabrics as the finished products.

Further, there has been a demerit that the water and oil repellency is initially high right after the treatment with a water and oil repellent is high, but tends to extremely deteriorate by abrasion during the use or by repeated washings. Namely, a water and oil repellent which can maintain the initial performance stably has been desired. Further, there are problems such as insufficient adhesion of the coating film on the surface and vulnerability to cracks and fractures which deteriorate the quality of the object, and therefore, it has been desired to overcome such problems.

Further, when a crystalline polymer is used as the main component, in order to obtain a uniform coating film having high water and oil repellency, usually, a post-application film formation step comprising melting the polymer at a temperature higher than the melting point of fine crystals and cooling has been essential. However, in the case of fiber products made of materials such as extrafine-denier fibers or modified cross-section fibers, such a high temperature treatment causes problems such as deterioration of color fastness, hard hand or fading, and therefore can lower the quality of treated objects.

Heretofore, in order to solve the problems with crystalline polymers, such techniques for lowering the crystallizability of the polymers and for making the polymers flexible are known. Further, for the purpose of forming a film at a low temperature, such techniques as use of a film coalescing aid and copolymerization of a polymerizable monomer containing a branched alkyl group and having an internal plasticization effect with a crystallizable $R^f$ group-containing monomer are known. However, in such a case, there are problems such as failure to development of water and oil repellency, insufficient coating film strength, inadequate adhesion to the substrate or deterioration of the durability because the crystals derived from $R^f$ groups for development of water and oil repellency are partially destroyed.

Further, there has been a problem that on a surface treated with a water and oil repellent having a crystalline polymer as an active component, the adhesion and the hand are not satisfied at the same time. Namely, even when attempts to impart various functions to the surface of fiber products treated with a water and oil repellent containing a crystalline polymer, such as attachment of a film laminate or a seam tape for imparting waterproofness, and attachment of a coating of a urethane or acrylic resin for imparting moisture permeability and waterproofness, were made. It has been difficult to secure sufficient adhesion because the crystallizable $R^f$ groups impair the adhesion. Use of a copolymer of a crystallizable $R^f$ group-containing monomer and a specific monomer such as vinyl chloride may improve adhesion, but it tends to make the hand of fibers still harder, and thus, the adhesion and the hand have not been satisfied at the same time.

Further, in recent years, as a medium for water and oil repellents, it is required to use a medium, which are friendly to the working and global environments, such as a water-based medium (hereinafter referred to as "aqueous medium"), an alcohol solvent, a petroleum solvent called a weak solvent or a fluorine solvent such as a hydrofluorocarbon having little influence on the ozone layer. However, conventional water and oil repellents having a crystalline polymer as an active component are not friendly to the working and global environments, because they need to use a so-called strong solvent such as an aromatic solvent, a ketone or an ester, a chlorinated solvent or a fluorinated solvent such as a chlorofluorocarbon having a great influence on the ozone layer.

The present inventors studied in detail the mechanism of development of water and oil repellency and found out that practically required functions such as substantial water and oil repellency and durability can be developed by using a polymer containing polymerization units of a specific $R^f$ group monomer which has not been used in the field of water and oil repellent coatings because its homopolymer has no melting point or a low melting point attributable to fine crystals derived from $R^f$ groups and the homopolymer has a glass transition point of at least 20° C., and polymerization units of a monomer having a specific cross-linkable functional group, presumably by virtue of the synergistic effect of acceleration of the surface orientation of the $R^f$ group and fixation of the $R^f$ group.

A water and oil repellent based on this concept can form a coating film at a lower temperature than conventional water and oil repellents. The resulting coating film is flexible and tough, and is excellent in adhesion to a substrate.

Accordingly, water and oil repellency can be imparted to objects without accompanying conventionally problematic quality deterioration due to e.g. hardening of the hand or embrittlement of films. Further, sufficient water and oil repellency can be imparted even if the resulting object is treated at a lower temperature than before. Further, the performance hardly deteriorates even by e.g. abrasion or washing.

Further, such a water an oil repellent shows much better adhesion during lamination or coating than conventional water and oil repellents. Further, the copolymer in the present invention dissolves well in e.g. an alcohol solvent, a weak solvent or an ozone-friendly fluorinated solvent such as hydrofluorocarbon, and therefore a solvent having few environmental and safety problems can be used as a medium.

DISCLOSURE OF THE INVENTION

The present invention provides a water and oil repellent composition, which comprises, as an essential component, a copolymer containing at least 80 mass % of polymerization units of the following monomer (a) and polymerization units of the following monomer (b):

Monomer (a): a monomer having an $R^f$ group, which forms a homopolymer having no melting point or a melting point of at most 55° C. attributable to fine crystals derived from the $R^f$ groups, and having a glass transition point of at least 20° C., Monomer (b): a monomer having no $R^f$ group and having a cross-linkable functional group.

Further, the present invention provides a water and oil repellent composition, which comprises, as an essential component, a copolymer containing at least 30 mass % and less than 80 mass % of polymerization units of the following monomer (a) and polymerization units of the following monomer (b), and further containing polymerization units of the following monomer (c), Monomer (c): at least one monomer having no $R^f$ group other than the monomer (b), which contains at least 50 mass % of the following monomer (c1) or the following monomer (c2) based on the total amount of monomer (c), Monomer (c1): a monomer which forms a homopolymer having a melting point of at least 30° C. attributable to fine crystals.

Monomer (c2): a monomer other than monomer (c1), which forms a homopolymer having a glass transition point of from −50° C. to 40° C.

In the present invention, it is important to contain polymerization units of the monomer (a) having an $R^f$ group, which forms a homopolymer having no melting point or a melting point of at most 55° C. attributable to fine crystals derived from the $R^f$ groups, and having a glass transition point of at least 20° C. Further, in the present invention, it is also important to contain polymerization units of the monomer (b) copolymerizable with the monomer (a) and having a cross-linkable functional group.

BEST MODE FOR CARRYING OUT THE INVENTION

In the present invention, the monomer (a) is an $R^f$ monomer which forms a homopolymer having no melting point attributable to fine crystals derived from the $R^f$ groups or having a melting point of at most 55° C., and having a glass transition point of at least 20° C. The monomer (a) may be a mixture of at least two types of $R^f$ monomers.

The presence or absence of the melting point attributable to fine crystals derived from $R^f$ groups can be confirmed by differential calorimetry (a DSC method described in JIS-K-7121-1987 and K-7122-1987). In the case of this method, when the calories accompanying the melting or solidification of the fine crystals are at most 3 kJ/mol, it is judged that the $R^f$ group-containing polymer does not contain fine crystals.

The presence or absence of fine crystals derived from $R^f$ groups can be confirmed also by observing a peak attributable to their self-packing by means of wide-angle or small-angle X-ray scattering accessorily. If fine crystals are present in the polymer, the observed spacing of their characteristic packing planes is usually about 5 Å.

The $R^f$ monomer means a compound having an $R^f$ group and a polymerizable unsaturated group. The $R^f$ group is an alkyl group having some or all of hydrogen atoms substituted by fluorine atoms, and preferably has from 1 to 20 carbon atoms, more preferably from 1 to 12 carbon atoms. The $R^f$ group is preferably an alkyl group having at least from 20 to 80% in number of hydrogen atoms substituted by fluorine atoms. Further, some or all of the remaining hydrogen atoms may be substituted by chlorine atoms. The $R^f$ group may be linear or branched. If branched, it preferably has a short branch at or around the far end from the connecting bond.

Among the above-mentioned preferred $R^f$ groups, a linear $R^F$ group represented by the formula $F(CF_2)_h—$ (wherein h is an integer of from 1 to 20), or a group represented by the formula $C_jF_{2j+1}(CM^1M^2CM^3M^4)_i$- (wherein $M^1$, $M^2$, $M^3$ and $M^4$ are independently hydrogen atoms, fluorine atoms or chlorine atoms with the proviso that one of them is a fluorine atom, and j and i are integers of at least 1 which satisfy $20 \geq (j+2 \times i) \geq 6$) is preferred. Particularly, an $R^F$ group having at most 6 carbon atoms is preferred.

The $R^f$ group is preferred to have a small number of carbon atoms is preferred since fine crystals derived from the $R^f$ groups are not likely to be formed when a homopolymer is formed from the $R^f$ groups, and the copolymer can form a flexible film. The $R^f$ group may be an acyclic polyfluorohydrocarbon group having at least one unsaturated group such as carbon-carbon unsaturated double bonds.

Specific examples of the $R^f$ group are given below, but the $R^f$ group is not limited thereto:

$F(CF_2)_4—$, $F(CF_2)_5—$, $F(CF_2)_6—$, $(CF_3)_2CF(CF_2)_2—$, $H(CF_2)_6—$, $HCF_2CF_2—$, $Cl(CF_2)_4—$, $F(CF_2)_4(CH_2CF_2)_3—$, $F(CF_2)_6(CH_2CF_2)_3—$, $F(CF_2)_4(CFClCF_2)_2—$, $CF_3CF=CFCF_2CF=CF—$, $CF_3CF_2C(CF_3)=CH(CF_3)(CF_2CF_3)$, $C_kF_{2k+1}O[CF(CF_3)CF_2O]_e—CF(CF_3)—$ and $C_3F_7O[CF(CF_3)CF_2O]_e(CF_2)_k—$ (wherein k is an integer of from 3 to 6, and e is an integer of from 0 to 3).

The $R^f$ group and the polymerizable unsaturated group may be bonded by a single bond or via a bivalent organic group. As the bivalent organic group, a group containing an alkylene group is preferred. The alkylene group may be linear or branched. Further, the bivalent organic group may contain e.g. $—O—$, $—NH—$, $—CO—$, $—SO_2—$ or $—CD^1=CD^2-$ (wherein $D^1$ and $D^2$ independently represent hydrogen atoms or methyl groups). As the bivalent organic group, an alkylene group is preferred.

As the bivalent organic group, a group represented by the formula $—R^M-Q-R^N—$ (wherein $R^M$ and $R^N$ independently represent single bonds or saturated or unsaturated hydrocarbon groups having from 1 to 22 carbon atoms which may contain at least one oxygen atom, and Q represents a single bond, $—OCONH—$, $—CONH—$, $—SO_2NH—$ or $—NH-CONH—$) is preferred.

As specific examples of the bivalent organic group, $—CH_2—$, $—CH_2CH_2—$, $—CH_2CH_2CH_2—$, $—(CH_2)_{11}—$, $—CH_2CH_2CH(CH_3)—$, $—CH=CHCH_2—$, $—(CH_2CHR^2O)_pCH_2CH_2—$ (wherein p is an integer of from 1 to 10, and $R^2$ represents a hydrogen atom or a methyl group), $—C_2H_4OCONHC_2H_4—$, $—C_2H_4OCOOC_2H_4—$ and $—COOC_2H_4—$ are preferably mentioned.

As the polymerizable unsaturated group, an ethylenic polymerizable unsaturated group such as an olefin residue, a vinyl ether residue, a vinyl ester residue, a (meth)acrylate residue, a maleate residue or a fumarate residue, is preferred. Here, an olefin residue means a group represented by $—CR=CH_2$, a vinyl ester residue means a group represented by $—COOCR=CH_2$, a vinyl ether residue means a group represented by $—OCR=CH_2$, a (meth)acrylate residue means a group represented by $—OCOCR=CH_2$, and a maleate or fumarate residue means a group represented by $—OCOCH=CHCOO—$. In addition, $—OCH_2—\phi—CR=CH_2$ and $—OCH=CH_2$ may, for example, be mentioned (wherein $\phi$ represents a phenylene group).

The R is preferably a hydrogen atom, a halogen atom (a fluorine atom, a chlorine atom, etc.) or a short-chain alkyl group having from 1 to 3 carbon atoms (particularly a methyl group), in order not to hinder polymerization. In consideration of the polymerizability in preparation of a copolymer, X is preferably a (meth)acrylate residue, or a maleate or fumarate residue, and from the viewpoint of e.g. the solubility in the solvent or easiness of emulsion polymerization, a (meth)acrylate residue, especially a methacrylate residue, is particularly preferred.

The monomer (a) is preferably a compound represented by the formula $(Z—Y)_nX$. Z is an $R^F$ group having at most 6 carbon atoms, n is 1 or 2, provided that when n is 2, the two $(Z—Y)$'s may be the same or different from each other. X is $—CR=CH_2$, $—COOCR=CH_2$, $—OCOCR=CH_2$, $—OCH_2—\phi—CR=CH_2$ or $—OCH=CH_2$ when n is 1, and is $=CH(CH_2)_mCR=CH_2$, $=CH(CH_2)_mCOOCR=CH_2$, $=CH(CH_2)_mOCOCR=CH_2$ or $—OCOCH=CHCOO—$ (wherein R is a hydrogen atom, a methyl group or a halogen atom, $\phi$ is a phenylene group, and m is an integer of from 0 to 4) when n is 2. Further, Y is a bivalent organic group or a single bond.

The monomer (a) is preferably a (meth)acrylate having an $R^f$ group, more preferably a methacrylate having an $R^f$ group from the viewpoint of e.g. the polymerizability with additional monomers, flexibility of the resulting film, adhesion to the substrate, solubility in the solvent and easiness of emulsion polymerization. As such a monomer (a), various monomers may be used, and known monomers may be used.

In a case of a (meth)acrylate where the $R^f$ group is an R group, and Y is $—(CH_2)—$, $—(CH_2CH_2)—$ or $—(CH_2)_3—$, if the $R^F$ group has at least 7 carbon atoms, the melting point attributable to fine crystals will be higher than 55° C. and the intended function will not be developed, and such a monomer is excluded from the monomer (a) to be employed in the present invention. In such a case, the $R^f$ group is preferably an $R^F$ group having at most 6 carbon atoms, most preferably a linear $R^F$ group having from 4 to 6 carbon atoms.

When Y is $—CH_2CH_2CH(CH_3)—$ or $—CH=CH—CH_2—$ and X is a (meth)acrylate, the $R^f$ group preferably has from 1 to 10 carbon atoms, more preferably from 4 to 9 carbon atoms.

The monomer (b) in the present invention does not have an $R^f$ group and has a cross-linkable functional group. The cross-linkable functional group preferably has at least one bond of a covalent bond, an ionic bond and a hydrogen bond, or can form a cross-linked structure by interaction between these bonds.

The functional group in the monomer (b) is preferably e.g. an isocyanate group, a blocked isocyanate group, an alkoxysilyl group, an amino group, an alkoxymethylamido group, a silanol group, an ammonium group, an amido group, an epoxy group, a hydroxyl group, an oxazoline group, a carboxyl group, an alkenyl group or a sulfonic acid group, particularly preferably a blocked isocyanate group, an alkoxysilyl group or an amino group.

The monomer (b) is preferably a (meth)acrylate, a vinyl ether or a vinyl ester. As the monomer (b), a mixture of at least two may be used. As the monomer (b) the following compounds are mentioned preferably.

2-Isocyanatoethyl(meth)acrylate, 3-isocyanatopropyl(meth)acrylate, 4-isocyanatobutyl(meth)acrylate, the 2-butanone oxime adduct of 2-isocyanatoethyl(meth)acrylate, the pyrazole adduct of 2-isocyanatoethyl(meth)acrylate, the 3,5-dimethylpyrazole adduct of 2-isocyanatoethyl(meth)acrylate, the 3-methylpyrazole adduct of 2-isocyanatoethyl(meth)acrylate, the $\epsilon$-caprolactam adduct of 2-isocyanatoethyl(meth)acrylate, the 2-butanone oxime adduct of 3-isocyanatopropyl(meth)acrylate and the pyrazole adduct of 3-isocyanatopropyl(meth)acrylate.

The 3,5-dimethylpyrazole adduct of 3-isocyanatopropyl (meth)acrylate, the 3-methylpyrazole adduct of 3-isocyanatopropyl(meth)acrylate, the ε-caprolactam adduct of 3-isocyanatopropyl(meth)acrylate, the 2-butanone oxime adduct of 4-isocyanatobutyl(meth)acrylate, the pyrazole adduct of 4-isocyanatobutyl(meth)acrylate, the 3,5-dimethylpyrazole adduct of 4-isocyanatobutyl(meth)acrylate, the 3-methylpyrazole adduct of 4-isocyanatobutyl(meth)acrylate and the ε-caprolactam adduct of 4-isocyanatobutyl(meth)acrylate.

Methoxymethyl(meth)acrylamide, ethoxymethyl(meth)acrylamide, butoxymethyl(meth)acrylamide, 3-methacryloyloxypropyltrimethoxysilane, trimethoxyvinylsilane, vinyltrimethoxysilane, dimethylaminoethyl(meth)acrylate, diethylaminoethyl(meth)acrylate, dimethylaminopropyl (meth)acrylate, (meth)acryloylmorpholine, (meth)acryloyloxyethyltrimethylammonium chloride, (meth)acryloyloxypropyltrimethylammonium chloride, (meth)acrylamidoethyltrimethylammonium chloride and (meth)acrylamidopropyltrimethylammonium chloride.

t-Butyl(meth)acrylamidosulfonic acid, (meth)acrylamide, N-methyl(meth)acrylamide, N-methylol(meth)acrylamide, diacetone(meth)acrylamide, glycidyl (meth)acrylate, 2-hydroxyethyl(meth)acrylate, 2-hydroxypropyl(meth)acrylate, 4-hydroxybutyl(meth)acrylate, 3-chloro-2-hydroxypropyl methacrylate, polyoxyalkylene glycol mono(meth)acrylate, (meth)acrylic acid, 2-(meth)acryloylxyethylsuccinic acid, 2-(meth)acryloylxyhexahydrophthalic acid, 2-(meth)acryloyloxyethyl acid phosphate, allyl(meth)acrylate, 2-vinyl-2-oxazoline and 2-vinyl-4-methyl-(2-vinyloxazoline).

The monomer (c) in the present invention is a monomer having no $R^f$ group other than the monomer (b), and is at least one monomer containing at least 50 mass % of 1) a monomer (c1) which forms a homopolymer having a melting point of at least 30° C. attributable to fine crystals or 2) a monomer (c2) as a monomer other than the monomer (c1), which forms a homopolymer having a glass transition point of from −50° C. to 40° C., based on the monomer (c). As the monomer (c), a mixture of at least two may be used.

The melting point attributable to fine crystals in the homopolymer formed from monomer (c1) is the melting point attributable to fine crystals derived from the organic group such as an alkyl group in the homopolymer. The presence or absence of the melting point attributable to fine crystals derived from the organic group can be confirmed by differential calorimetry (a DSC measurement described in JIS-K-7121-1987 or K-7122-1987). In the present method, when the calories associated with melting or solidification of the fine crystals are at most 3 kJ/mol, it is judged that the homopolymer does not contain fine crystals.

The monomer (c1) is preferably a (meth)acrylate, a vinyl ester or a vinyl ether. The monomer (c1) preferably has a hydrocarbon group with at least 14 carbon atoms, more preferably has a saturated hydrocarbon group with from 16 to 40 carbon atoms, and furthermore preferably it is a (meth)acrylate having an alkyl group with from 16 to 40 carbon atoms. The monomer (c1) is preferably stearyl (meth)acrylate or behenyl(meth)acrylate. A copolymer containing polymerization units of the monomer (c1) particularly gives fibers excellent water and oil repellency.

The monomer (c2) is preferably a monomer which helps formation of a uniform copolymer solution or a dispersion having good film forming properties. The copolymer containing polymerization units of monomer (c2) can particularly give papers excellent water and oil repellency. The monomer (c2) is preferably methyl acrylate, ethyl acrylate, propyl acrylate, butyl methacrylate, cyclohexyl acrylate, 2-ethylhexyl (meth)acrylate, butyl methacrylate, n-hexyl(meth)acrylate, cyclohexyl acrylate, vinyl acetate, vinyl propionate or vinylidene chloride, more preferably methyl acrylate, butyl methacrylate, 2-ethylhexyl methacrylate, vinyl acetate or vinylidene chloride.

The monomer (c) may contain an additional monomer (c3) in addition to monomer (c1) and monomer (c2), and the following monomers may be mentioned as the additional monomer (c3).

Butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene, chloroprene, vinyl chloride and vinylidene fluoride.

N,N-Dimethyl(meth)acrylamide, vinyl alkyl ether, haloalkyl vinyl ether, vinyl alkyl ketone, butyl acrylate, propyl methacrylate, cyclohexyl methacrylate, benzyl (meth)acrylate, octyl (meth)acrylate, decyl methacrylate, dodecyl acrylate, cyclododecyl acrylate, lauryl (meth)acrylate, 3-ethoxypropyl acrylate, methoxy-butyl acrylate, 2-ethylbutyl acrylate, 1,3-dimethylbutyl acrylate, 2-methylpentyl acrylate, aziridinylethyl(meth)acrylate, 2-ethylhexylpolyoxyalkylene(meth)acrylate and polyoxyalkylene di(meth)acrylate.

An alkyl crotonate, an alkyl maleate, an alkyl fumarate, an alkyl citraconate, an alkyl mesaconate, triallyl cyanurate, allyl acetate, N-vinylcarbazole, maleimide, N-methylmaleimide, (meth)acrylate having a silicone side chain, (meth)acrylate having a urethane bond, (meth)acrylate having a polyoxyalkylene chain having a terminal $C_{1-4}$ alkyl group, alkylene di(meth)acrylate, etc.

The additional monomer (c3) is particularly preferably vinyl chloride, difunctional polyoxyethylene di(meth)acrylate or ethylene glycol di(meth)acrylate. The additional monomer (c3) can improve adhesion of the composition to a substrate and formation of strong coating films. The ratio of polymerization units of the additional monomer (c3) in the copolymer is preferably less than 20 mass % based on the copolymer.

When the copolymer in the present invention contains at least 80 mass % of polymerization units of the monomer (a) and polymerization units of the monomer (b), the mass ratio of polymerization units of the monomer (a)/polymerization units of the monomer (b) is preferably 70.0-99.9/0.1-30.0, more preferably 75-99.5/0.5-25. Within this compositional range, the resulting water and oil repellent composition is excellent in water and oil repellency, durability and the adhesion to a substrate while maintaining the film flexibility sufficiently. The copolymer preferably contains polymerization units of the monomer (c) further. The ratio of polymerization units of the monomer (c) in the copolymer is preferably from 1 to 20 mass %, more preferably from 1 to 15 mass %. If the copolymer contains polymerization units of the monomer (c), the water repellency, the oil repellency, the durability and the flexibility will be more excellent.

Further, the copolymer in the present invention contains at least 30 mass % and less than 80 mass % of polymerization units of the monomer (a) and polymerization units of the monomer (b). When the copolymer further contains polymerization units of the monomer (c), the mass ratio of polymerization units of the monomer (a)/polymerization units of the monomer (b)/polymerization units of the monomer (c) is preferably 1.0-78.8/0.1-30.0/1.0-50, more preferably 60.0-78.8/0.1-20.0/1.0-40.0. This compositional range is preferred because the resulting water and oil repellent composition is excellent in water and oil repellency, durability and the adhesion to a substrate while maintaining sufficient film flexibility, the hardness can be maintained, and the hand is good. In the copolymer, the total of polymerization units of the monomer (a), the monomer (b) and the monomer (c) is preferably at least 80 mass %.

In the present invention, if a copolymer containing at least 80 mass % of polymerization units of the monomer (a) and polymerization units of the monomer (b) is used, water and oil repellent performance develops. Further, in the case of a copolymer containing at least 30 mass % and less than 80 mass % of the polymerization units of the monomer (a) and polymerization units of the monomer (b), water and oil repellent performance develops if the copolymer contains polymerization units of at least one monomer (c) which contains at least 50 mass % of the monomer (c1) or the monomer (c2) based on the total amount of the monomer (c).

The copolymer in the present invention preferably consists essentially of polymerization units of the monomer (a) and polymerization units of the monomer (b). Further, the copolymer in the present invention preferably consists essentially of polymerization units of the monomer (a), the monomer (b) and the monomer (c). Further, the ratio of polymerization units of the monomer (c) in the copolymer is preferably from 10 mass % to 30 mass %.

The content of the copolymer in the water and oil repellent composition of the present invention is preferably from 1 to 40 mass %, more preferably from 5 to 35 mass %, particularly preferably from 10 to 30 mass %.

The water and oil repellent composition of the present invention preferably contains a medium. The medium is preferably water, an alcohol, a glycol, a glycol ether, a halogenated compound, a hydrocarbon, a ketone, an ester, an ether, a nitrogen compound, a sulfur compound, an inorganic solvent, an organic acid or the like, more preferably at least one medium selected from the group consisting of water, an alcohol, a glycol, a glycol ether and a glycol ester in view of solvency and ease of handling. Specific preferred examples of the medium are mentioned below.

Preferred alcohols are methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, 3-heptanol and the like.

Preferred glycols and glycol ethers are ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, propylene glycol and the like, and preferred glycol ethers are propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol, hexylene glycol and the like.

Preferred halogenated compounds are halogenated hydrocarbons, halogenated ethers and the like. As halogenated hydrocarbons, hydrochlorofluorocarbons, hydrofluorocarbons, hydrobromocarbons and the like are mentioned. Preferred hydrochlorofluorocarbons are $CH_3CCl_2F$, $CHCl_2CF_2CF_3$, $CHClFCF_2CClF$ and the like.

Preferred hydrofluorocarbons are $CF_3CF_2CF_2CHF_2$, $CF_3CF_2CF_2CH_2F$, $CF_3CF_2CH_2CF_3$, $CHF_2CF_2CF_2CHF_2$, $CHF_2CH_2CF_2CF_3$, $CF_3CHFCH_2CF_3$, $CF_3CH_2CF_2CHF_2$, $CHF_2CHFCF_2CHF_2$, $CF_3CHFCF_2CH_3$, $CHF_2CHFCHFCHF_2$, $CF_3CH_2CF_2CH_3$, $CF_3CF_2CH_2CH_3$, $CHF_2CH_2CF_2CH_3$, $CHF_2CF_2CF_2CF_2CF_3$, $CF_3CF_2CF_2CHFCF_3$, $CHF_2CF_2CF_2CF_2CHF_2$, $CF_3CHFCHFCF_2CF_3$, $CF_3CHFCF_2CH_2CF_3$, $CF_3CF(CF_3)CH_2CHF_2$, $CF_3CH(CF_3)CH_2CF_3$, $CF_3CH_2CF_2CH_2CF_3$, $CHF_2CHFCF_2CHFCHF_2$, $CHF_2CF_2CF_2CHFCH_3$, $CF_3CH_2CH_2CH_2CF_3$, $CHF_2CH_2CF_2CH_2CHF_2$, $CF_3(CF_2)_4CHF_2$, $CF_3(CF_2)_4CH_2F$, $CF_3CF_2CF_2CF_2CH_2CF_3$, $CHF_2CF_2CF_2CF_2CF_2CHF_2$, $CF_3CH(CF_3)CHFCF_2CF_3$, $CF_3CF_2CH_2CH(CF_3)CF_3$, $CF_3CH_2CF_2CF_2CH_2CF_3$, $CF_3CF_2CH_2CH_2CF_2CF_3$, $CF_3CF_2CF_2CF_2CH_2CH_3$, $CF_3CH(CF_3)CH_2CH_2CF_3$, $CHF_2CF_2CH_2CH_2CF_2CHF_2$, $CF_3CF_2CF_2CH_2CH_2CH_3$ and the like.

Preferred hydrobromocarbons are $CH_2Br_2$, $CH_2BrCH_2CH_3$, $CH_3CHBrCH_3$, $CH_2BrCHBrCH_3$ and the like, preferred halogenated ethers are hydrofluoro ethers and the like, and preferred hydrofluoro ethers are separated hydrofluoro ethers, non-separated hydrofluoro ethers and the like. A separated hydrofluoro ether is a compound in which a perfluoroalkyl or perfluoroalkylene group is bonded to an alkyl or alkylene group via an ether oxygen atom. A non-separated hydrofluoro ether is a hydrofluoro ether containing a partially fluorinated alkyl or alkylene group.

Preferred separated hydrofluoro ethers are $CF_3CF_2CF_2OCH_3$, $(CF_3)_2CFOCH_3$, $CF_3CF_2CF_2OCH_2CH_3$, $CF_3CF_2CF_2CF_2OCH_3$, $(CF_3)_2CFCF_2OCH_3$, $(CF_3)_3COCH_3$, $CF_3CF_2CF_2CF_2OCH_2CH_3$, $(CF_3)CFCF_2OCH_2CH_3$, $(CF_3)_3COCH_2CH_3$, $CF_3CF(OCH_3)CF(CF_3)_2$, $CF_3CF(OCH_2CH_3)CF(CF_3)_2$, $C_5F_{11}OCH_2CH_3$, $CF_3CF_2CF_2CF(OCH_2CH_3)CF(CF_3)_2$, $CH_3O(CF_2)_4OCH_3$, $CH_3OCF_2CF_2OCH_2CH_3$, $C_3H_7OCF(CF_3)CF_2OCH_3$ and the like.

Preferred non-separated hydrofluoro ethers are $CHF_2OCF_2OCHF_2$, $CH_2FCF_2OCHF_2$, $CF_3CF_2CF_2OCH_2F$, $CF_3CF_2OCH_2CHF_2$, $CHF_2CF_2CH_2OCF_3$, $CF_3CF_2CH_2OCHF_2$, $CHF_2CF_2OCH_2CHF_2$, $CF_3CH_2OCF_2CH_2F$, $CF_3CH_2OCF_2CHF_2$, $CHF_2CF_2CF_2OCH_3$, $HF_2CF_2CH_2OCH_3$, $CF_3CF_2CF_2OCH_2CF_3$, $CF_3CF_2CH_2OCF_2CF_3$, $CF_3CF_2CF_2OCH_2CHF_2$, $CF_3CF_2CH_2OCF_2CHF_2$, $CHF_2CF_2CH_2OCF_2CF_3$, $CHF_2CF_2CH_2OCF_2CHF_2$, $CF_3CHFCF_2CH_2OCF_3$, $CF_3CHFCF_2CH_2OCHF_2$, $CF_3CF_2CF_2CH_2OCH_3$, $(CF_3)_2CHCF_2OCH_3$, $CF_3CF_2CF_2OCH_2CF_2CF_3$, $CF_3CF_2CF_2OCH_2CF_2CHF_2$, $CF_3CF_2CF_2CF_2OCF_2CHF_2$, $CF_3(CF_2)_5OCHF_2$, $CHF_2OCF_2CF_2OCHF_2$, $CHF_2OCF_2OCF_2CF_2OCHF_2$, $CHF_2OCF_2OCF_2OCF_2OCHF_2$ and the like.

Preferred hydrocarbons are aliphatic hydrocarbons, alicyclic hydrocarbons, aromatic hydrocarbons and the like. Preferred aliphatic hydrocarbons are pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane, hexadecane and the like.

Preferred alicyclic hydrocarbons are cyclopentane, methylcyclopentane, cyclohexane, methylcyclohexane, ethylcyclohexane and the like. Preferred aromatic hydrocarbons are benzene, toluene, xylene and the like.

Preferred ketones are acetone, methyl ethyl ketone, 2-pentanone, 3-pentanone, 2-hexanone, methyl isobutyl ketone and the like.

Preferred esters are methyl acetate, ethyl acetate, putyl acetate, methyl propionate, methyl lactate, ethyl lactate, pentyl lactate and the like. Preferred ethers are diisopropyl ether, dioxane, tetrahydrofuran and the like.

Preferred nitrogen compounds are pyridine, N,N-dimethylformamide, N,N-dimethylacetamide, N-methylpyrrolidone and the like. Preferred sulfur compounds are dimethyl sulfoxide, sulfolane and the like. As an inorganic solvent, liquid carbon dioxide is preferred. Preferred organic acids are acetic acid, propionic acid, malic acid, lactic acid and the like.

In the present invention, a mixture of two or more media may be used, and in such a case, a mixture containing water is preferably used. A medium mixture is preferably used because the solubility and dispersibility of the copolymer are readily controlled, and the permeability and wetting property of the substrate and the solvent drying rate are readily controlled at the time of treatment. The medium content in the water and oil repellent composition is preferably from 60 to 95 mass %, more preferably from 70 to 90 mass %.

The water and oil repellent composition of the present invention preferably contains a surfactant (s) because the copolymer is readily dispersed in the medium.

As the surfactant (s), a hydrocarbon or fluorine surfactant may be used, and an anionic, nonionic, cationic or amphoteric surfactant may be used. From the viewpoint of dispersion stability, a nonionic surfactant is preferred, and the combination of a nonionic surfactant with another ionic surfactant is particularly preferred. As the surfactant to be combined, a cationic surfactant or an amphoteric surfactant is preferred. Particularly, the combination of a nonionic surfactant with a cationic surfactant is preferred. Combined use of a nonionic surfactant and a cationic surfactant is preferred because it reduces hydrophilicity, and thereby excellent water and oil repellency can be imparted to a substrate.

The nonionic surfactant is preferably at least one nonionic surfactant selected from the group consisting of the following surfactants $s^1$ to $s^6$.

Surfactant $s^1$: Polyoxyalkylene monoalkyl ether, polyoxyalkylene monoalkenyl ether, polyoxyalkylene monoalkapolyenyl ether or polyoxyalkylene monopolyfluoroalkyl ether.

Surfactant $s^2$: A nonionic surfactant comprising a compound having at least one carbon-carbon triple bond and at least one hydroxyl group in the molecule, Surfactant $s^3$: A nonionic surfactant comprising a compound having a connection of polyoxyethylene chains (hereinafter referred to as POE) having at least two oxyethylenes tandemly connected and chains having at least two oxyalkylenes having at least 3 carbon atoms tandemly connected, and having hydroxyl groups on both terminals, Surfactant $s^4$: A nonionic surfactant having an amine oxide moiety in the molecule, Surfactant $s^5$: A nonionic surfactant comprising a condensate of polyoxyethylene mono(substituted phenyl)ether or polyoxyethylene mono(substituted phenyl)ether, Surfactant $s^6$: A nonionic surfactant comprising a fatty acid ester of a polyol.

The alkyl group, the alkenyl group, the alkapolyenyl group or the polyfluoroalkyl group (hereinafter referred to as an $R^s$ group) in the surfactant $s^1$ preferably has from 4 to 26 carbon atoms. The $R^s$ group may be linear or branched. As the branched structure, a secondary alkyl group, a secondary alkenyl group or a secondary alkapolyenyl group is preferred. Further, some or all of the hydrogen atoms may also be substituted by fluorine atoms.

Specific examples of the $R^s$ group include an octyl group, a dodecyl group, a tetradecyl group, a hexadecyl group, an octadecyl group, a hexadecyl group, a behenyl group (docosyl group), an oleyl group (9-octadecenyl group), a heptadecylfluorooctyl group, a tridecylfluorohexyl group, a 1H,1H,2H,2H-tridecylfluorooctyl group and a 1H,1H,2H,2H-nonafluorohexyl group.

The surfactant $s^1$ is preferably a polyoxyalkylene monoalkyl ether, a polyoxyalkylene monoalkenyl ether or a polyoxyalkylene monopolyfluoroalkyl ether. $R^1$ may be one kind or a combination of two or more kinds.

The polyoxyalkylene chain (hereinafter referred to as POA) of the surfactant $s^1$ is preferably a chain having at least two of POE and/or polyoxypropylene chains (hereinafter referred to as POP) connected. The POA may be one kind or a combination of at least two kinds of POA. When the POA comprises two kinds, they are preferably connected in blocks.

The surfactant $s^1$ is more preferably a compound represented by the following formula $S^{11}$.

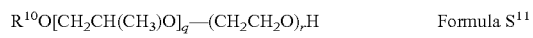
$$R^{10}O[CH_2CH(CH_3)O]_q-(CH_2CH_2O)_rH \qquad \text{Formula } S^{11}$$

$R^{10}$ is an alkyl group having at least 8 carbon atoms or an alkenyl group having at least 8 carbon atoms, s is an integer of from 5 to 50, and q is 0 or an integer of from 1 to 20. When q and r are at least 2, the POE and the POP in the formula $S^{11}$ are connected in blocks. It is preferred that $R^{10}$ has a linear or branched structure, r is an integer of from 10 to 30, and q is 0 or an integer of from 1 to 10. When r is at most 4 or q is at least 21, it hardly dissolves in water and does not uniformly dissolve in an aqueous medium, and therefore permeability of the water and oil repellent composition into a material to be treated is poor. When r is at least 51, the hydrophilicity will be high, and therefore the water repellency will be low.

Specific examples of the compound represented by the formula $s^{11}$ include the following compounds. Here, POE and POP are connected in blocks.

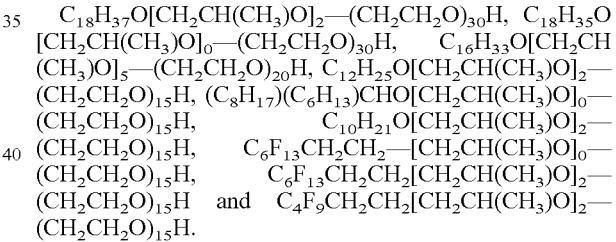

$C_{18}H_{37}O[CH_2CH(CH_3)O]_2-(CH_2CH_2O)_{30}H$, $C_{18}H_{35}O[CH_2CH(CH_3)O]_0-(CH_2CH_2O)_{30}H$, $C_{16}H_{33}O[CH_2CH(CH_3)O]_5-(CH_2CH_2O)_{20}H$, $C_{12}H_{25}O[CH_2CH(CH_3)O]_2-(CH_2CH_2O)_{15}H$, $(C_8H_{17})(C_6H_{13})CHO[CH_2CH(CH_3)O]_0-(CH_2CH_2O)_{15}H$, $C_{10}H_{21}O[CH_2CH(CH_3)O]_2-(CH_2CH_2O)_{15}H$, $C_6F_{13}CH_2CH_2-[CH_2CH(CH_3)O]_0-(CH_2CH_2O)_{15}H$, $C_6F_{13}CH_2CH_2[CH_2CH(CH_3)O]_2-(CH_2CH_2O)_{15}H$ and $C_4F_9CH_2CH_2[CH_2CH(CH_3)O]_2-(CH_2CH_2O)_{15}H$.

The surfactant $s^2$ is preferably a nonionic surfactant comprising a compound having one carbon-carbon triple bond and one or two hydroxyl groups in the molecule. The surfactant $s^2$ may have POA in the molecule. As the POA, a chain having POE, POP, POE and POP randomly connected, or a chain having POE and POP connected in blocks is mentioned.

Specific examples of the surfactant $s^2$ are preferably compounds represented by the following formula $s^{21}$, $s^{22}$, $s^{23}$ or $s^{24}$.

$$HO-CR^{11}R^{12}-C\equiv C-CR^{13}R^{14}-OH \qquad \text{Formula } s^{21}$$

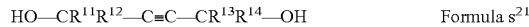

$$HO-(A^1O)_u-CR^{11}R^{12}-C\equiv C-CR^{13}R^{14}-(OA^2)_v-OH \qquad \text{Formula } S^{22}$$

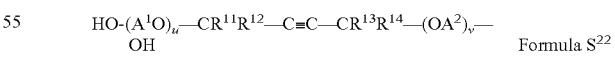

$$HO-CR^{15}R^{16}-C\equiv C-H \qquad \text{Formula } s^{23}$$

$$HO-(A^3O)_w-CR^{15}R^{16}-C\equiv C-H \qquad \text{Formula } s^{24}$$

Here, $A^1$, $A^2$ and $A^3$ are independently alkylene groups, u and v are respectively integers of at least 0, (u+v) is an integer of at least 1, and w is an integer of at least 1. When u, v or w is at least 2, $A^1$, $A^2$ and $A^3$ may be respectively one kind or a combination of two or more kinds.

Each of $R^{11}$ to $R^{16}$ is independently a hydrogen atom or an alkyl group. The alkyl group is preferably a $C_1$-$C_{12}$ alkyl group, more preferably a $C_1$-$C_4$ alkyl group. Specific examples include a methyl group, an ethyl group, a propyl group, a butyl group, an isobutyl group and the like.

The POA is preferably POE, POP or a chain containing POE and POP. The number of repeating units in the POA is preferably from 1 to 50.

The surfactant $s^2$ is preferably a nonionic surfactant represented by the following formula $s^{25}$, wherein x and y are respectively 0 or integers of from 1 to 100. The nonionic surfactant represented by the formula $s^{25}$ may be one kind or a combination of two or more kinds.

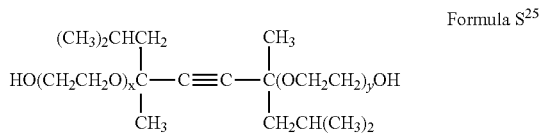

Formula S$^{25}$

The nonionic surfactant of the formula $s^{25}$ is preferably a nonionic surfactant, wherein x and y are 0, the total of x and y is from 1 to 4 on average, or the total of x and y is from 10 to 30 on average.

The POA having at least 3 carbon atoms in the surfactant $s^3$ is preferably a polyoxytetramethylene chain (hereinafter referred to as POT) and/or POP.

The surfactant $c^3$ is preferably a nonionic surfactant represented by the following formula $s^{31}$ or $s^{32}$, wherein g 1 is 0 or an integer of from 1 to 200, t is an integer of from 2 to 100, and g2 is 0 or an integer of from 1 to 200, with the proviso that when g1 is 0, g2 is an integer of at least 2, and the proviso that when g2 is 0, g1 is an integer of at least 2. The unit —$C_3H_6O$— may be —$CH(CH_3)CH_2$—, —$CH_2CH(CH_3)$— or a mixture of —$CH(CH_3)CH_2$— and —$CH_2CH(CH_3)$—. The POA is block-like.

Formula S$^{31}$,

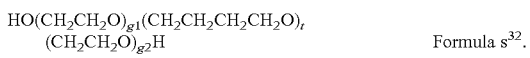

Formula s$^{32}$.

Specific examples of the surfactant $s^3$ include the following compounds.

HO—$(CH_2CH_2O)_{15}$—$(C_3H_6O)_{35}$—$(CH_2CH_2O)_xH$, HO—$(CH_2CH_2O)_8$—$(C_3H_6O)_{35}$—$(CH_2CH_2O)_8H$, HO—$(CH_2CH_2O)_{45}$—$(C_3H_6O)_{17}$—$(CH_2CH_2O)_{45}H$ and HO—$(CH_2CH_2O)_{34}$—$(CH_2CH_2CH_2CH_2O)_{28}$—$(CH_2CH_2O)_{34}H$.

The surfactant $s^4$ is preferably a nonionic surfactant represented by the following formula $s^{41}$.

Formula s$^{41}$

Here, $R^{17}$, $R^{18}$ and $R^{19}$ are independently monovalent hydrocarbon groups. In the present invention, a surfactant having amine oxide (N→O) is regarded as a nonionic surfactant. The surfactant $s^4$ may be one kind or a combination of two or more kinds.

In view of dispersion stability of the polymer, the surfactant $s^4$ is preferably a nonionic surfactant represented by the following formula $s^{42}$.

Formula s$^{42}$ $R^{20}$ is a $C_6$-$C_{22}$ alkyl group, a $C_6$-$C_{22}$ alkenyl group, a phenyl group having an alkyl group (from 6 to 22 carbon atoms) bonded or a phenyl group having a alkenyl group (from 6 to 22 carbon atoms) bonded, or a $C_6$-$C_{13}$ fluoroalkyl group, and is preferably a $C_8$-$C_{22}$ alkyl group, a $C_8$-$C_{22}$ alkenyl or a $C_4$-$C_9$ polyfluoroalkyl group.

Specific examples of the nonionic surfactant represented by the formula $s^{42}$ include the following compounds.

[H(CH$_2$)$_{12}$](CH$_3$)$_2$N (→O), [H(CH$_2$)$_{14}$](CH$_3$)$_2$N(→O), [H(CH$_2$)$_{16}$](CH$_3$)$_2$N(→O), [H(CH$_2$)$_{18}$](CH$_3$)$_2$N (→O), [F(CF$_2$)$_6$(CH$_2$)$_2$](CH$_3$)$_2$N (→O) and [F(CF$_2$)$_4$(CH$_2$)$_2$](CH$_3$)$_2$N(→O).

The substituted phenyl group in the surfactant $s^5$ is preferably a phenyl group substituted by a monovalent hydrocarbon group, more preferably a phenyl group substituted by an alkyl group, an alkenyl group or a styryl group.

The surfactant $s^5$ is preferably a polyoxyethylene mono (alkylphenyl)ether condensate, a polyoxyethylene mono(alkenylphenyl)ether condensate, a polyoxyethylene mono(alkylphenyl)ether, a polyoxyethylene mono(alkenylphenyl)ether or a polyoxyethylene mono[(alkyl)(styryl)phenyl]ether.

Specific examples of the polyoxyethylene mono (substituted phenyl)ether condensate or polyoxyethylene mono (substituted phenyl)ether include a polyoxyethylene mono (nonylphenyl)ether-formaldehyde condensate, polyoxyethylene mono(nonylphenyl)ether, polyoxyethylene mono(octylphenyl)ether, polyoxyethylene mono(oleylphenyl)ether, polyoxyethylene mono[(nonyl)(styryl)phenyl]ether and polyoxyethylene mono[(oleyl)(styryl)phenyl]ether.

The polyol in the surfactant $s^6$ is glycerin, sorbitan, sorbite, polyglycerin, polyethylene glycol, polyoxyethylene glyceryl ether, polyoxyethylene sorbitan ether or polyoxyethylene sorbite ether.

As the surfactant $s^6$, the 1:1 (molar ratio) ester of octadecanoic acid and polyethylene glycol, the 1:4 (molar ratio) ester of sorbite-polyethylene glycol ether and oleic acid, the 1:1 (molar ratio) ester of polyoxyethylene glycol-sorbitan ether and octadecanoic acid, the 1:1 (molar ratio) ester of polyethylene glycol-sorbitan ether and oleic acid, the 1:1 (molar ratio) ester of dodecanoic acid and sorbitan, the 1:1 or 2:1 (molar ratio) ester of oleic acid and decaglycerin, the 1:1 or 2:1 (molar ratio) ester of octadecanoic acid and decaglycerin may, for example, be mentioned.

In the present invention, when the surfactant contains a cationic surfactant $s^7$, a cationic surfactant in the form of a substituted ammonium salt is preferably used. The cationic surfactant in the form of substituted ammonium salt is preferably an ammonium salt, in which at least one hydrogen atom bonded to the nitrogen atom is substituted by an alkyl group, an alkenyl group or a POA having a terminal hydroxyl group, more preferably a compound represented by the following formula $s^{71}$.

Formula s$^{71}$

Here, $R^{21}$ is a hydrogen atom, a $C_1$-$C_{22}$ alkyl group, a $C_2$-$C_{22}$ alkenyl group, a $C_1$-$C_9$ fluoroalkyl group or a POA having a terminal hydroxyl group, and four $R^{21}$'s may be the same or different, but not all the four $R^{21}$'s are hydrogen atoms at the same time. X$^-$ is a counter ion.

$R^{21}$ is preferably a long chain alkyl group having from 6 to 22 carbon atoms, a long chain alkenyl group having from 6 to 22 carbon atoms or a fluoroalkyl group having from 1 to 9 carbon atoms. When $R^{21}$ is an alkyl group other than a long chain alkyl group, a methyl group or an ethyl group is preferred. When $R^{21}$ is a polyoxyalkyl group, a polyoxyethyl group is preferred. X$^-$ is preferably a chlorine ion, an ethyl sulfate ion or an acetate ion.

As the compound represented by the formula $s^{71}$, monooctadecyltrimethylammonium chloride, monooctadecyldimethylmonoethylammonium ethyl sulfate, mono(octadecyl) monomethyldi(polyethylene glycol)ammonium chloride, monononafluorohexyltrimethylammonium chloride, di(tallow alkyl)dimethylammonium chloride, dimethyl monococonut amine acetate may, for example, be mentioned.

In the present invention, when the surfactant contains an amphoteric surfactant $s^8$, an amphoteric surfactant such as an alanine, an imidazolinium betaine, an amido betaine or an acetate betaine is preferred. As the hydrophobic group, $R^{21}$ is preferably a long chain alkyl group having from 6 to 22 carbon atoms, a long chain alkenyl group having from 6 to 22 carbon atoms or a fluoroalkyl group having from 1 to 9 carbon atoms. Specific examples of the amphoteric surfactant $s^8$ include dodecyl betaine, octadecyl betaine, dodecyl carboxymethyl hydroxyethyl imidazolinium betaine, dodecyl dimethyl aminoacetate betaine and fatty acid amidopropyldimethyl aminoacetate betaine.

The surfactant (s) may be a polymer surfactant ($s^9$) comprising a block or random polymer of a hydrophilic monomer, a hydrocarbon hydrophobic monomer and/or a fluorinated hydrophobic monomer or a hydrophobic modified product of a hydrophilic polymer.

Specific examples of the surfactant ($s^9$) include a block or random polymer of polyethylene glycol(meth)acrylate and a long chain alkyl acrylate, a block or random polymer of polyethylene glycol(meth)acrylate and a fluoro(meth)acrylate, a block or a random polymer of vinyl acetate and a long chain alkyl vinyl ether, a block or a random polymer of vinyl acetate and a long chain alkyl vinyl ester, a polymer of styrene and maleic anhydride, a condensate of polyvinyl alcohol and stearic acid, a condensate of polyvinyl alcohol and stearyl mercaptan, a condensate of polyallylamine and stearic acid, a condensate of polyethylene imine and stearyl alcohol, methyl cellulose, hydroxypropyl methylcellulose and hydroxyethyl methylcellulose.

The surfactant ($s^9$) is, for example, MP polymer (trade number: MP-103, MP-203) manufactured by KURARAY CO., LTD., SMA resin manufactured by Elf Atochem, METOLOSE manufactured by Shin-Etsu Chemical Co., Ltd., EPOMIN RP manufactured by NIPPON SHOKUBAI CO., LTD. or SURFLON (trade number: S-381 and S-393) manufactured by Seimi Chemical Co., Ltd.

Further, when the medium is an organic solvent or contains an organic solvent at a high mixing ratio, a polymer surfactant comprising a block copolymer or random polymer (or a polyfluoroalkyl modified product thereof) of a lipophilic monomer and a fluorinated monomer can be used. Specific examples include a polymer of an alkyl acrylate and a fluoro (meth)acrylate and a polymer of an alkyl vinyl ether and a fluoroalkyl vinyl ether. For example, Surflon (trade number: S-383, SC-100 series) manufactured by Seimi Chemical Co., Ltd. may be mentioned.

The content of the surfactant (s) is preferably from 1 to 10 parts by mass, particularly preferably from 3 to 8 parts by mass based on 100 parts by mass of the copolymer. The content of the surfactant is preferably in the range because emulsion stability is good, the durability of the water and oil repellent performance is excellent, and color fastness is maintained.

When a cationic surfactant $s^7$ and/or an amphoteric surfactant $s^8$ are used as the surfactant (s), it is preferred to use them in combination with nonionic surfactants $s^1$ to $s^6$ and $s^9$. The contents of a cationic surfactant and/or an amphoteric surfactant are preferably from 0.1 to 2 parts by mass based on 100 parts by mass of the copolymer respectively. This range is preferred for successful combined use of a dying assistant.

The method of preparing the copolymer as the active component in the water and oil repellent composition of the present invention is not particularly limited. For example, common polymerization methods such as solution polymerization using an organic solvent, non-aqueous dispersion polymerization, dispersion polymerization using water containing a nonionic surfactant and/or a cationic surfactant, a nonionic surfactant and/or an amphoteric surfactant, or a nonionic surfactant and/or an anionic surfactant as the dispersion medium, emulsion polymerization or suspension polymerization may be employed. Particularly, the copolymer is preferably produced by emulsion polymerization in a medium containing water. The solution, dispersion or emulsion of the resulting polymer may be used as it is, or may be used after dilution. Otherwise, the copolymer may be isolated, and then dissolved, dispersed or emulsified in a solvent, dispersion medium or emulsion polymerization medium.

The polymerization is preferably preceded by pre-emulsification (preliminary mixing and dispersing) in a high pressure emulsifier or the like. For example, a mixture of monomers, a surfactant and an aqueous medium is preferably agitated into a dispersion with a homomixer, a high pressure emulsifier or the like. The preliminary mixing and dispersing of the raw material mixture before the polymerization preferably improves the overall yield of the resulting polymer.

To start the polymerization, heat, light, radiation, a radical polymerization initiator, an ionic polymerization initiator or the like is preferably used. Particularly, a water-soluble or oil-soluble radical polymerization initiator is preferred, and commonly used initiators such as azo polymerization initiators, peroxide polymerization initiators or redox initiators may be used depending on the polymerization temperature. As the polymerization initiator, an azo compound is particularly preferred, and a salt of an azo compound is more preferred for polymerization in a medium containing water. The polymerization temperature is not particularly limited, but is preferably from 20 to 150° C.

In the polymerization, a molecular weight modifier may also be used. The molecular weight modifier is preferably an aromatic compound or a mercaptan, particularly preferably an alkyl mercaptan. Specific examples include n-octyl mercaptan, n-dodecyl mercaptan, tert-dodecyl mercaptan, stearyl mercaptan, α-methylstyrene dimer ($CH_2$=$CPhCH_2$ $C(CH_3)_2Ph$, wherein Ph is a phenyl group) and the like.

In the water and oil repellent composition of the present invention, the copolymer is preferably dispersed as particles in the medium. The copolymer dispersed in the medium has an average particle size of preferably from 10 to 1000 nm, more preferably from 10 to 300 nm, most preferably from 10 to 200 nm. The average particle size is preferably in the range because it is not necessary to use a surfactant, a dispersant or the like in a large amount, the water and oil repellency is good, dyed clothes do not crock upon treatment, and dispersed particles are stable and do not settle in the medium. In the present invention, the average particle size can be measured by using a dynamic light scattering apparatus, an electron microscope or the like.

Various additives such as a penetrant, a defoaming agent, a water absorbent, an antistatic agent, an anticrease agent, a hand adjusting agent, a film-forming auxiliary agent, a water-soluble polymer such as polyacrylamide or polyvinyl alcohol and a thermosetting agent such as a melamine resin or a urethane resin may be added to the water and oil repellent composition of the present invention, as the case requires.

The water and oil repellent composition of the present invention is useful for water and oil repellent treatment of clothes such as sports wear, coats, blousons, working clothes or uniforms, fiber products such as bags or industrial materials, leather products, stones, concrete building-materials and the like. Further, it is also useful as a coating agent for filters to be used in the presence of an organic solvent liquid or vapor, as a surface protecting agent, as a coating agent for electronics or as an antifouling coating agent. Further, it may be shaped with polypropylene, nylon or the like into fiber to impart water and oil repellency.

There is no particular restriction on the object to be treated with the water and oil repellent composition of the present invention, and it may, for example, be a fiber made of e.g. a natural fiber, a synthetic fiber or the blended fiber thereof, a non-woven fabric, a resin, a paper, a leather, a metal, a stone, concrete, gypsum or glass.

Because treatment of an object with the water and oil repellent composition of the present invention provides a flexible coating film, it can impart a soft hand and high quality water and oil repellency to a fiber product. Further, the composition adheres to a surface well and can impart water and oil repellency even when cured at low temperatures. Further, its performance hardly deteriorates by abrasion or washing and can be stably maintained at the initial level right after treatment. Further, when paper is treated with the composition, an excellent sizing property and water repellency and oil repellency can be imparted to the paper even under cold drying conditions. When a resin, glass or metal surface is treated with the composition, it readily forms a water and oil repellent coating film having good adhesion to a substrate.

The water and oil repellent composition of the present invention can impart water and oil repellency to an object even though fine crystals derived from the $R^f$ groups in the copolymer contained therein has no specific melting point or a melting point of at most 55° C. and has a glass transition point of at least 20° C. Further, since the composition forms a flexible coating film, water and oil repellency can be imparted to an object without impairing the quality such as a hand. It can develop excellent water and oil repellency, even if the composition is applied at a low temperature, as compared with conventional products. Further, a coating film having excellent strength and adhesion to the substrate can be obtained. Further, since it is excellent in durability against abrasion and washing, it can maintain the initial performance unlike conventional products. Still further, it can form a flexible and hardly adhesion coating inhibitory film which can be further coated with a functional film.

EXAMPLES

Now, the present invention will be described more specifically with reference to Examples of the present invention (Examples 2 to 5, 9 to 11, 13, 14, 16 to 18, 20 to 23, 26 to 34, 37, 38 and 42 to 48), Comparative Examples (Examples 1, 6 to 8, 12, 15, 19, 24, 25, 39 to 41 and 49) and Reference Examples (Examples 35 and 36). However, the present invention is not limited thereto. Further, in Tables, marks (a) to (c3) after monomer names represent monomers classified as the above-mentioned monomers (a) to (c3), and monomers not having marks represent additional monomers.

Example 1

In a 300 mL glass beaker, 34.4 g of $C_6F_{13}C_2H_4OCOC(CH_3)=CH_2$ (hereinafter referred to as FMA, which forms a homopolymer having no melting point attributable to fine crystals (hereinafter referred to as $T_m$) and a glass transition point (hereinafter referred to as $T_g$) of 51.5° C.), 1.1 g of polyoxyethylene oleyl ether as an emulsifier (an adduct with about 20 mol of ethylene oxide, hereinafter referred to as PEO-25), 0.3 g of a polyoxyethylene-polyoxypropylene-polyoxyethylene block copolymer (molecular weight: 3300, polyoxypropylene ratio: 60 mass %, hereinafter referred to as PEPP-33), 0.3 g of stearyltrimethylammonium chloride (hereinafter referred to as STMAC), 48.9 g of ion exchanged water, 13.7 g of dipropylene glycol (hereinafter referred to as DPG) and 0.2 g of normal dodecyl mercaptan (hereinafter referred to as nDSH) were heated for 30 minutes at 50° C. and stirred with a homomixer (Biomixer, manufactured by Nihon Seiki Seisakusho) to give a liquid mixture.

The resulting liquid mixture was processed with a high pressure emulsifier (Minilab, manufactured by APV LANNIE K.K.) into an emulsion at 40 MPa, while maintained at 50° C. 80 g of the resulting emulsion was put into a 100 mL glass ample and cooled to 30° C. or below. After vapor phase replacement with nitrogen, 0.14 g of 2,2'-azobis[2-(2-imidazolin-2-yl)propane] (hereinafter referred to as VA061) as an initiator and 0.1 g of acetic acid were added, and polymerization was carried out at 55° C. for 12 hours with shaking, to give an emulsion having a solid content of 28.6%.

Examples 2 to 8

Polymerization was carried out in the same manner as in Example 1 except that the monomers shown in Table 1 were used in the amounts (unit: g) shown in Table 1 to give emulsions.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| FMA(a) | 34.4 | 32.3 | 32.3 | 32.3 | 33.0 | — | — | — |
| FA | — | — | — | — | — | 34.4 | 32.3 | — |
| 8FA | — | — | — | — | — | — | — | 32.3 |
| 35DPBI(b) | — | 2.1 | — | — | — | — | 2.1 | 2.1 |
| BOBI(b) | — | — | 2.1 | — | — | — | — | — |
| BOIPBI(b) | — | — | — | 2.1 | — | — | — | — |
| GMA(b) | — | — | — | — | 1.4 | — | — | — |
| Solid content % | 28.6 | 30.7 | 29.3 | 30.3 | 28.2 | 29.1 | 29.6 | 27.5 |

The abbreviations in Table 1 have the following meanings.
FA: $C_6F_{13}C_2H_4OCOCH=CH_2$ ($T_m$: not exist $T_g$: not exist),
8FA: $C_8F_{17}C_2H_4OCOCH=CH_2$ ($T_m$: 75° C., $T_g$: not exist),
35DPBI: 3,5-Dimethylpyrazole adduct of 2-isocyanatoethyl(meth)acrylate,
BOBI: 2-Butanone oxime adduct of 2-isocyanatoethyl (meth)acrylate and
GMA: Glycidyl methacrylate.
BOIPBI:

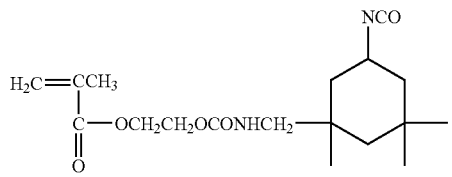

Example 9

Into a 1 L glass beaker, 228.4 g of FMA, 61.8 g of stearyl acrylate ($T_m$: 42° C., $T_g$: not exist, hereinafter referred to as StA), 18.5 g of 35 DPBI, 9.6 g of PEO-25, 2.8 g of PEPP-33, 2.8 g of STMAC, 447.5 g of ion exchanged water, 123.6 g of DPG and 2.2 g of nDSH were put, and the same operation as in Example 1 was carried out to obtain a liquid mixture.

The resulting liquid mixture was processed into an emulsion with a high pressure emulsifier (LAB60-10TBS, manufactured by APV GAULIN K.K.) at 40 MPa, while maintained at 50° C. 697.6 g of the resulting emulsion was placed in a 1 L stainless steel autoclave and cooled to 30° C. or below. 1.4 g of VA061 as a polymerization initiator and 1.0 g of acetic acid were added, and after vapor phase replacement with nitrogen, polymerization was carried out at 55° C. for 12 hours with stirring to give an emulsion having a solid content of 35.5%.

Examples 10 to 15

Polymerization was carried out in the same manner as in Example 9 except that the monomers shown in Table 2 were used in the amounts (unit: g) shown in Table 2 to give emulsions.

TABLE 2

|  | Ex. 9 | Ex. 10 | Ex. 11 | Ex. 12 | Ex. 13 | Ex. 14 | Ex. 15 |
|---|---|---|---|---|---|---|---|
| FMA(a) | 228.4 | 228.4 | 228.4 | 247.0 | 114.2 | 228.4 | 228.4 |
| FPMA | — | — | — | — | 114.2 | — | — |
| 35DPBI(b) | 18.5 | 18.5 | 18.5 | — | 18.5 | 18.5 | 18.5 |
| StA(c1) | 61.8 | — | 30.9 | 61.8 | 61.8 | 46.4 | — |
| VA(c1) | — | 61.8 | 30.9 | — | — | — | — |
| BA(c3) | — | — | — | — | — | 15.4 | 81.8 |
| Solid content % | 35.5 | 34.1 | 35.3 | 35.1 | 34.3 | 35.0 | 33.8 |

The abbreviations in Table 2 have the following meanings.
FPMA: $C_6F_{13}C_3H_6OCOC(CH_3)=CH_2$,
VA: Behenyl acrylate ($T_m$: 72° C., $T_g$: not exist),
BA: Butyl acrylate ($T_m$: not exist, $T_g$: −54° C.)

Example 16

Into a 1 L glass beaker, 228.4 g of FMA, 30.9 g of StA, 18.5 g of 35DPBI, 9.6 g of PEO-25, 2.8 g of PEPP-33, 2.8 g of STMAC, 447.5 g of ion exchanged water, 123.5 g of DPG and 2.2 g of nDSH were put, and the same operation as in Example 1 was carried out to obtain a liquid mixture.

An emulsion was obtained by using the resulting liquid mixture in the same manner as in Example 9. 695.7 g of the resulting emulsion was placed in a 1 L stainless steel autoclave and cooled to 30° C. or below. Then, 2.4 g of VA061 and 1.9 g of acetic acid were added thereto, and the vapor phase was replaced with nitrogen. Then, 24.0 g of vinyl chloride ($T_m$: not exist, $T_g$: 98° C., hereinafter referred to as VCM) was injected, and polymerization was carried out at 55° C. for 12 hours with stirring to give an emulsion having a solid content of 35.9%.

Examples 17 to 20

Polymerization was carried out in the same manner as in Example 16 except that the monomers shown in Table 3 were used in the amounts (unit: g) shown in Table 3 to give emulsions obtained in Examples 17 to 19. Further, in Example 20, an emulsion is obtained in the same manner as in Example 16.

TABLE 3

|  | Ex. 16 | Ex. 17 | Ex. 18 | Ex. 19 | Ex. 20 |
|---|---|---|---|---|---|
| FMA(a) | 228.4 | 228.4 | 171.3 | — | 228.4 |
| FPMA | — | — | 57.1 | 228.4 | — |
| 8FA | — | — | — | 18.5 | — |
| 35DPBI(b) | 18.5 | 18.5 | 18.5 | 30.9 | 18.5 |
| StA(c1) | 30.9 | — | 30.9 | — | — |
| VA(c1) | — | 30.9 | — | — | — |
| BA(c3) | — | — | — | 24.0 | 30.9 |
| VCM(c3) | 24.0 | 24.0 | 24.0 | — | 24.0 |
| Solid content % | 35.9 | 35.0 | 35.2 | 34.0 | 34.8 |

Preparation of Test Cloths

Using the emulsions obtained in Examples 1 to 29, test cloths A were prepared by the following method to evaluate water repellency, oil repellency and washing durability. With respect to Example 20, evaluation was carried out in the same manner. The results were shown in Table 6.

Each of the resulting emulsions was diluted with ion exchanged water to a solid content of 1.0 mass %, to obtain test liquids A. Dyed polyester cloths and undyed cotton broadcloths were coated with test liquids A by dip coating and squeezed to wet pick-ups of 90 mass % and 70 mass % respectively. They were dried at 110° C. for 90 seconds and then at 170° C. for 60 seconds, and designated as test cloths A.

Further, using the emulsions obtained in Examples 9 and 16, test cloths B were prepared by the following method to evaluate abrasion resistance. With respect to the emulsions obtained in Examples 10 to 15 and 17 to 20, test cloths B are prepared by the following method to evaluate abrasion durability in the same manner.

The resulting emulsions were diluted with ion exchanged water to a solid content of 1.0 mass %, to obtain test liquids B. Dyed cotton broadcloths were coated with these test liquids B by dip coating and squeezed to wet pick-ups of 70 mass %. They were dried at 110° C. for 90 seconds and then at 170° C. for 60 seconds and designated as test cloths B.

Evaluation of Water Repellency

Water repellency evaluated by the spray test according to JIS L-1092-1992 on the scale shown in Table 4.

TABLE 4

| Water repellency | State |
|---|---|
| 100 | No wetting or water-droplet adhesion on the surface |
| 90 | Slight water-droplet adhesion on the surface |
| 80 | Partial spotty wetting on the surface |
| 70 | Wetting on half of the surface |
| 50 | Wetting over the entire surface |
| 0 | Complete wetting on both surfaces |

Evaluation of Oil Repellency

Oil repellency was evaluated according to AATCC-TM118-1966, and the results were represented by the oil repellency numbers as defined in Table 5.

TABLE 5

| Oil repellency number | Test solution | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Nujol 65 parts/hexadecane 35 parts | 29.6 |
| 1 | Nujol | 31.2 |
| 0 | Less than 1 | — |

Washing Durability

According to the water washing method of JIS-L0217 Appendix Table 103, washing was repeated five times or ten times, followed by air-drying to evaluate water repellency and oil repellency.

Hand Test

Hands of the test cloths were evaluated by sensory analysis (on a five-rank scale of soft, slightly soft, moderate, slightly hard and hard).

Abrasion Durability Test

Using a peeling tester manufactured by Toyo Seiki Seisaku-sho Ltd., the test cloths A and B were abraded 200 times with a friction block, and water repellency and oil repellency were evaluated.

TABLE 6

| | | Polyester tropical | | | | Cotton broad | | | |
| | | Initial stage | | Durability after 5 washings | | Initial stage | | Durability after 5 washings | |
| Ex. | Hand | Oil repellency | Water repellency | Oil repellency | Water repellency | Oil repellency | Water repellency | Oil repellency | Water repellency |
|---|---|---|---|---|---|---|---|---|---|
| 1 | 1 | 3 | 100 | 1 | 50 | 4 | 70 | 0 | 0 |
| 2 | 2 | 4 | 100 | 2 | 75 | 4 | 100 | 3 | 80 |
| 3 | 2 | 4 | 100 | 2 | 75 | 4 | 100 | 3 | 75 |
| 4 | 2 | 4 | 100 | 2 | 70 | 4 | 100 | 2 | 75 |
| 5 | 2 | 4 | 100 | 1 | 70 | 3 | 100 | 1 | 70 |
| 6 | 1 | 3 | 50 | 1 | 0 | 5 | 0 | 1 | 0 |
| 7 | 2 | 4 | 80 | 0 | 0 | 5 | 80 | 2 | 0 |
| 8 | 5 | 4 | 100 | 2 | 80 | 3 | 75 | 2 | 70 |
| 9 | 2 | 4 | 100 | 2 | 90 | 4 | 100 | 2 | 80 |
| 10 | 2 | 4 | 100 | 2 | 80 | 4 | 100 | 2 | 80 |
| 11 | 2 | 4 | 100 | 2 | 85 | 4 | 100 | 2 | 80 |
| 12 | 1 | 4 | 100 | 1 | 50 | 3 | 100 | 1 | 50 |
| 13 | 2 | 4 | 100 | 2 | 85 | 4 | 100 | 2 | 80 |
| 14 | 2 | 4 | 100 | 2 | 80 | 4 | 100 | 3 | 80 |
| 15 | 2 | 4 | 90 | 2 | 70 | 3 | 80 | 2 | 50 |
| 16 | 2 | 4 | 100 | 4 | 90 | 5 | 100 | 4 | 90 |
| 17 | 3 | 4 | 100 | 3 | 90 | 5 | 100 | 4 | 85 |
| 18 | 2 | 4 | 100 | 3 | 90 | 5 | 100 | 4 | 85 |
| 19 | 5 | 5 | 100 | 4 | 100 | 5 | 100 | 4 | 90 |
| 20 | 3 | 3 | 90 | 3 | 80 | 4 | 90 | 3 | 70 |

TABLE 7

| | Initial stage | | After 200 abrasions | |
| Ex. | Oil repellency | Water repellency | Oil repellency | Water repellency |
|---|---|---|---|---|
| 9 | 4 | 100 | 4 | 95 |
| 10 | 4 | 100 | 3 | 95 |
| 11 | 4 | 100 | 4 | 95 |
| 12 | 3 | 95 | 3 | 90 |
| 13 | 4 | 100 | 4 | 90 |
| 14 | 4 | 100 | 4 | 90 |
| 15 | 3 | 80 | 3 | 70 |
| 16 | 5 | 100 | 4 | 95 |
| 17 | 5 | 100 | 3 | 90 |
| 18 | 5 | 100 | 4 | 95 |
| 19 | 5 | 100 | 4 | 80 |
| 20 | 4 | 90 | 3 | 70 |

Example 21

Into a 300 mL glass beaker, 38.8 g of FMA, 2.5 g of 35DPBI, 1.9 g of polyoxyethylene oleyl ether (an adduct with bout 26 mol of ethylene oxide, hereinafter referred to as PEO-30) as an emulsifier, 0.2 g of polyoxyethylene oleyl ether (an adduct with about 13 mol of ethylene oxide, hereinafter referred to as PEO-20), 59.9 g of water, 16.5 g of dipropylene glycol and 0.3 g of t-dodecyl mercaptan (hereinafter referred to as tDSH) as a molecular weight modifier were put.

This beaker was heated on a hot water bath at 50° C., and the content was stirred with a homomixer (Biomixer, manufactured by Nippon Seiki Seisaku-sho Ltd.) to obtain a liquid mixture. The liquid mixture was processed into an emulsion with a high pressure emulsifier (Minilabo, manufactured by APV LANNIE K.K.) at 40 MPa, while maintained at 50° C. 80 g of the resulting emulsion was put into a 100 mL glass ample and cooled to 30° C. or below. After vapor phase replacement with nitrogen, 0.14 g of VA061 and 0.1 g of acetic acid were added, and polymerization was carried out at 55° C. for 12 hours with shaking to give an emulsion having a solid content of 24.6%.

Examples 22 to 36

Polymerization was carried out in the same manner as in Example 21 except that the monomers shown in Tables 8 to 10 were used in the amounts (unit: g) shown in Tables 8 to 10 to give emulsions.

TABLE 8

|  | Ex. 21 | Ex. 22 | Ex. 23 | Ex. 24 | Ex. 25 | Ex. 26 |
|---|---|---|---|---|---|---|
| FMA(a) | 38.8 | 40.5 | 40.5 | 35.1 | 35.1 | 32.2 |
| 35DPBI(b) | 2.5 | — | — | — | — | 2.5 |
| DEAEMA(b) | — | 0.8 | — | — | — | — |
| TMSiMA(b) | — | — | 0.8 | — | — | — |
| Vac(c2) | — | — | — | 6.2 | — | 6.6 |
| VdCl(c2) | — | — | — | — | 6.2 | — |
| PEO-30 | 1.9 | 1.9 | 1.9 | 1.9 | 1.9 | 0.1 |
| PEO-20 | 0.2 | 0.2 | 0.2 | — | — | — |
| SFY485 | — | — | — | 0.2 | 0.2 | — |
| tDSH | 0.3 | 0.3 | 0.3 | 0.3 | 0.3 | 0.3 |
| Water | 59.9 | 59.9 | 59.9 | 59.9 | 59.9 | 59.9 |
| DPG | 16.5 | 16.5 | 16.5 | 16.5 | 16.5 | 16.5 |
| Solid content % | 24.6 | 25.2 | 26.1 | 22.0 | 22.0 | 25.7 |

TABLE 9

|  | Ex. 27 | Ex. 28 | Ex. 29 | Ex. 30 | Ex. 31 | Ex. 32 |
|---|---|---|---|---|---|---|
| FMA(a) | 33.3 | 38.4 | 33.8 | 32.6 | 32.6 | 32.6 |
| 35DPBI(b) | — | — | — | 2.5 | 2.5 | 2.5 |
| DEAEMA(b) | 0.8 | — | — | — | — | — |
| TMSiMA(b) | — | 0.8 | — | — | — | — |
| Vsi(b) | — | — | 0.8 | — | — | — |
| MA(c2) | — | — | — | — | — | 6.2 |
| BMA(c2) | — | — | — | 6.2 | — | — |
| Vac(c2) | 6.6 | 2.1 | 6.6 | — | — | — |
| VdCl(c2) | — | — | — | — | 6.2 | — |
| PEO-30 | 2.1 | 1.9 | 1.9 | 2.1 | 2.1 | 1.9 |
| SFY485 | — | 0.2 | 0.2 | — | — | 0.2 |
| tDSH | 0.3 | 0.3 | 0.3 | 0.3 | 0.3 | 0.3 |
| Water | 59.9 | 59.9 | 59.9 | 59.9 | 59.9 | 59.9 |
| DPG | 16.5 | 16.5 | 16.5 | 16.5 | 16.5 | 16.5 |
| Solid content % | 28.2 | 25.8 | 23.8 | 23.0 | 24.2 | 22.5 |

TABLE 10

|  | Ex. 33 | Ex. 34 | Ex. 35 | Ex. 36 |
|---|---|---|---|---|
| FMA(a) | 32.6 | 40.1 | — | — |
| 35DPBI(b) | 2.5 | — | — | — |
| TMSiMA(b) | — | 0.8 | — | 0.8 |
| DEAEMA(b) | — | 1.4 | — | — |
| 2EHMA(c2) | 6.2 | — | — | — |
| Vac(c2) | — | — | 41.3 | 40.5 |
| PEO-30 | 1.9 | — | 1.9 | 1.9 |
| PEO-25 | — | 1.3 | — | — |
| SFY485 | 0.2 | — | 0.2 | 0.2 |
| STMA | — | 0.3 | — | — |
| PEPP33 | — | 0.3 | — | — |
| tDSH | 0.3 | 0.3 | 0.3 | 0.3 |
| Water | 59.9 | 59.9 | 59.9 | 59.9 |
| DPG | 16.5 | 16.5 | 16.5 | 16.5 |
| Solid content % | 23.6 | 22.6 | 22.8 | 25.7 |

The abbreviations in Tables 8 to 10 have the following meanings.

DEAEMA: Diethylaminoethyl methacrylate,
TMSiMA: 3-Methacryloyloxypropyltrimethoxysilane,
Vsi: Vinyltrimethoxysilane
VAc: Vinyl acetate ($T_m$: not exist, and $T_g$: 32° C.),
VdCl: Vinylidene chloride ($T_m$: not exist, and $T_g$: −18° C.)
MA: Methyl acrylate ($T_m$: not exist, and $T_g$: 10° C.),
BMA: Buthyl methacrylate ($T_m$: not exist, and $T_g$: 20° C.),
2EHMA: 2-Ethylhexyl methacrylate ($T_m$: not exist, and $T_g$: −10° C.) and
SFY485: Tetramethyldecenediol adduct with about 30 mols of ethylene oxide.

Example 37

The emulsions obtained in Example 23 and Example 35 were mixed in a mass ratio of 85 to 15 on a solid basis and diluted with ion exchanged water to give a dispersion having a total solid content of 1.5 mass %.

Example 38

The emulsions obtained in Example 22 and Example 36 were mixed in a mass ratio of 85 to 15 on a solid basis, and diluted with ion exchanged water to give a dispersion having a total solid content of 1.5 mass %.

Example 39

Polymerization was carried out in the same manner as in Example 22 except that VdCl was used instead of FMA, and 1.9 g of PEO-20 and 0.2 g of SFY485 were used as emulsifiers to give an emulsion having a solid content of 26.1%.

Example 40

Polymerization was carried out in the same manner as in Example 39 except that 16.5 g of StA and 24.8 g of VdCl were used instead of VdCl and DEAEMA to give an emulsion having a solid content of 25.2%.

Example 41

Polymerization was carried out in the same manner as in Example 24 except that $C_wF_{2w+1}CH_2CH_2OCOCH=CH_2$ (w is 9 on average, $T_m$ is 78° C., and $T_g$ does not exist) was used instead of FMA in Example 24 to give an emulsion having a solid content of 26.2%.

Preparation of Coated Paper

The emulsions obtained in Examples 21 to 36 and 39 to 41 were each diluted with ion exchanged water to a solid content of 1.5 mass % to obtain treatment baths. The dispersions obtained in Examples 37 and 38 were used as treatment baths. Unsized paper (basis weight: 85 g/m²) was dipped in each treatment bath by dip coating, and the pick-up was made to be 75 mass % by means of a size-press. Then, the paper was dried for 60 seconds on a drum dryer heated at 100° C. or 80° C. to obtain a coated paper. The oil repellent degree and the water repellent degree of the coated paper obtained were evaluated. Hot drying indicates that the paper was dried at 100° C., and cold drying indicates that the paper was dried at 80° C. The results are shown in Table 13.

Evaluation of Oil Repellent Degree of Coated Paper

The grease resistances of the coated papers were evaluated in accordance with TAPPI T 559 cm-02. Testing liquids with kit numbers are shown in Table 11. The testing liquids were dripped on the surface of the coated paper, and 15 seconds later, judgment was made by visual observation as to whether or not the testing liquid penetrated the coated paper. The highest of the kit numbers of the testing liquids that did not penetrate the coated paper was defined as the oil repellent degree. Each component is expressed in mL.

TABLE 11

| Kit number | Castor oil | Toluene | Heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

Evaluation of Water Repellent Degree on Coated Paper

Water repellent degree was evaluated by JAPAN TAPPI paper pulp testing method No. 68, and the results are shown in Table 12.

TABLE 12

| Water repellent degree | Results |
|---|---|
| $R_0$ | A continuous trace having a uniform width |
| $R_2$ | A continuous trace slightly narrower than a water droplet |
| $R_4$ | A continuous trace discontinuing and having a width apparently narrower than a water-droplet |
| $R_6$ | Half of the trace is wet |
| $R_7$ | ¼ of the trace is wet with elongated water-droplets |
| $R_8$ | Small spherical droplets are scattered over at least ¼ of the trace |
| $R_9$ | Small spherical water-droplets are scattered sparsely |
| $R_{10}$ | Water-droplets roll off completely |

Preparation of Test Cloths

Using the emulsions obtained in Examples 21 to 23, 27, 28 and 39 to 41, test cloths D were prepared by the following method to evaluate water repellency, oil repellency and washing durability. The results are shown in Table 13.

Each of the resulting emulsions was diluted with ion exchanged water to a solid content of 1.5 mass %, and a trimethylolmelamine resin (tradename: Sumitex Resin M-3, manufactured by Sumitomo Chemical Co., Ltd.) and an organic amine salt catalyst (tradename: Sumitex Accelerator ACX, manufactured by Sumitomo Chemical Co., Ltd.) were incorporated each at a concentration of 0.3 mass %, to obtain test liquids D. Polyester cloths were coated with these test liquids D by dip coating and squeezed to wet pick-ups of 90 mass %. They were dried at 110° C. for 90 seconds and then at 170° C. for 60 seconds to prepare test cloths D.

Evaluation of Water Repellency

Water repellency was evaluated by the spray method in accordance with JIS L-1092, and the results were represented by water repellent degree as defined in Table 4.

Evaluation of Oil Repellency

Oil repellency was evaluated in accordance with AATCC-TM118-1966, and the results were represented by the oil repellency numbers as defined in Table 5.

Washing Durability

According to the water washing method of JIS-L0217 Appendix Table 103, the test cloths D were washed 10 times and dried at 75° C. for five minutes to evaluate water repellency and oil repellency.

TABLE 13

| | Paper | | | | Cloth | | | |
|---|---|---|---|---|---|---|---|---|
| | Hot drying | | Cold drying | | Initial performance | | Washing durability | |
| Ex. | Oil repellency | Water repellency | Oil repellency | Water repellency | Oil repellency | Water repellency | Oil repellency | Water repellency |
| 21 | 12 | $R_{10}$ | 12 | $R_{10}$ | 5 | 100 | 4 | 90 |
| 22 | 12 | $R_{10}$ | 11 | $R_9$ | 5 | 100 | 4 | 90 |
| 23 | 12 | $R_{10}$ | 12 | $R_{10}$ | 5 | 100 | 5 | 90 |
| 24 | 11 | $R_6$ | 11 | $R_6$ | — | — | — | — |
| 25 | 11 | $R_6$ | 11 | $R_6$ | — | — | — | — |
| 26 | 12 | $R_8$ | 12 | $R_8$ | — | — | — | — |
| 27 | 12 | $R_8$ | 12 | $R_7$ | 5 | 100 | 5 | 90 |
| 28 | 12 | $R_9$ | 12 | $R_9$ | 5 | 100 | 5 | 90 |
| 29 | 12 | $R_9$ | 11 | $R_7$ | — | — | — | — |
| 30 | 11 | $R_9$ | 11 | $R_8$ | — | — | — | — |
| 31 | 11 | $R_8$ | 11 | $R_8$ | — | — | — | — |
| 32 | 11 | $R_8$ | 11 | $R_7$ | — | — | — | — |
| 33 | 11 | $R_8$ | 11 | $R_8$ | — | — | — | — |
| 34 | 12 | $R_8$ | 11 | $R_8$ | — | — | — | — |
| 37 | 12 | $R_9$ | 12 | $R_9$ | — | — | — | — |
| 38 | 12 | $R_9$ | 12 | $R_9$ | — | — | — | — |
| 39 | 0 | $R_0$ | 0 | $R_0$ | 0 | 0 | 0 | 0 |
| 40 | 0 | $R_2$ | 0 | $R_0$ | 0 | 70 | 0 | 0 |
| 41 | 7 | $R_4$ | 5 | $R_2$ | 5 | 100 | 2 | 70 |

Example 42

Into a 100 mL glass polymerization ample, 9.7 g of FMA and 0.3 g of trimethoxyvinylsilane were put as polymerizable monomers, and 30.0 g of 1H-perfluorohexane and 0.03 g of 2,2'-azobis(2-methylbutyronitrile) were put. After replacement of the atmosphere in the ample with nitrogen, polymerization was carried out with shaking at 60° C. for 24 hours to give a composition. The resulting composition was dried, and the solid content was measured and was found to be 25.0%.

Example 43

A composition was obtained in the same manner as in Example 41 except that 9.7 g of FMA and 0.3 g of TMSiMA were put as polymerizable monomers, and 30.0 g of $C_4F_9OCH_3$ was used. The solid content was 24.8%.

Example 44

A composition was obtained in the same manner as in Example 42 except that 8.0 g of FMA, 1.8 g of cyclohexyl methacrylate ($T_m$: not exist, $T_g$: 83° C.) and 0.2 g of GMA were put as polymerizable monomers, and 30 g of dichloropentafluoropropane was used. The solid content was 24.9%.

Example 45

A composition was obtained in the same manner as in Example 42 except that 7.5 g of FMA, 2.0 g of 2-ethylhexyl acrylate ($T_m$: not exist, $T_g$: -50° C.) and 0.5 g of 3-chloro-2-hydroxypropyl methacrylate were put as polymerizable monomers, and 30 g of dichloropentafluoropropane was used. The solid content was 24.7%.

Example 46

A composition was obtained in the same manner as in Example 42 except that 5.5 g of FMA, 4.0 g of VA and 0.5 g of isocyanatoethyl methacrylate were put as polymerizable monomers, and 30 g of hexane was used. The solid content was 25.0%.

Example 47

A composition was obtained in the same manner as in Example 42 except that 6.0 g of FMA, 2.0 g of ethyl methacrylate ($T_m$: not exist, $T_g$: 65° C.) and 2.0 g of acrylic acid were put as polymerizable monomers, and 30 g of isopropyl alcohol was used. The solid content was 24.7%.

Example 48

A composition was obtained in the same manner as in Example 42 except that 8.0 g of FMA, 1.5 g of $CH_3(OC(CH_3)CH_2)_nOCOC(CH_3)=CH_2$ (n is 9 on average) and 0.5 g of N-methylolacrylamide were put as polymerizable monomers, and 30 g of dipropylene glycol monomethyl ether was used. The solid content was 24.8%.

Example 49

A composition was obtained in the same manner as in Example 42 except that 8.0 g of C8FA, 1.8 g of cyclohexyl methacrylate and 0.2 g of GMA were put as polymerizable monomers, and 30 g of dichloropentafluoropropane was used. The solid content was 24.8%.

Evaluation Method

Test specimens were prepared in accordance with the following method to evaluate water and oil repellency, adhesion of a coating film and a substrate, film forming properties and coating film hardness. The results are shown in Table 14.

Preparation of Test Specimens

The compositions obtained in Examples 42 to 49 were diluted with solvents used in polymerization to a solid content of 2 mass % to obtain test liquids E. Glass plates were immersed with these test liquids E by dip coating, withdrawn and dried at room temperature.

Evaluation of Water and Oil Repellency

Water repellency was evaluated by putting pure water droplets on a test specimen and measuring the contact angle. Further, oil repellency was evaluated by putting n-hexadecane droplets on a test specimen and measuring the contact angle.

Evaluation of Adhesion, Film Forming Property and Coating Film Hardness

Coating film adhesion, film forming property and coating film hardness were evaluated by the pencil scratch test.

TABLE 14

| Ex. | Water contact angle | n-Hexadecane contact angle | Pencil scratch test |
|---|---|---|---|
| 42 | 116° | 76° | 4H |
| 43 | 116° | 76° | 4H |
| 44 | 113° | 70° | 4H |
| 45 | 110° | 71° | 2H |
| 46 | 115° | 70° | 2H |
| 47 | 108° | 71° | 2H |
| 48 | 105° | 70° | B |
| 49 | 116° | 78° | 6B |

INDUSTRIAL APPLICABILITY

The water and oil repellent composition of the present invention is preferably used for fiber products such as clothes.

The entire disclosure of Japanese Patent Application No. 2002-300325 filed on Oct. 15, 2002 including specification, claims and summary is incorporated herein by reference in its entirety.

What is claimed is:

1. A water and oil repellent composition, which comprises a copolymer comprising repeating units of the following monomer (a) and repeating units of the following monomer (b), wherein the total content of said repeating units is at least 80 mass % of repeating units of said copolymer:

Monomer (a): an ethylenically polymerizable monomer having a perfluoroalkyl group, which forms a homopolymer having no melting point or a melting point of at most 55° C. attributable to fine crystals derived from the perfluoroalkyl group, and having a glass transition point of at least 20° C., Monomer (b): an ethylenically polymerizable monomer having no polyfluoroalkyl group and having a cross-linkable functional group, wherein the monomer (a) is a compound represented by $(Z-Y)_nX$ provided that the symbols in the formula have the following meanings:

Z: a perfluoroalkyl group having at most 6 carbon atoms,
Y: a bivalent organic group or a single bond,
n: 1 or 2,
X: a polymerizable unsaturated group, which is —CR=CH$_2$, —COOCR=CH$_2$, —OCOCR=CH$_2$, —OCH$_2$-φ-CR=CH$_2$ or —OCH=CH$_2$ when n is 1, and is >CH(CH$_2$)$_m$CR=CH$_2$, >CH(CH$_2$)$_m$COOCR=CH$_2$, >CH(CH$_2$)$_m$OCOCR=CH$_2$, or —OCOCH=CHCOO— when n is 2, wherein R is a hydrogen atom, a methyl group or a halogen atom, φ is a phenylene group and m is an integer of from 0 to 4, wherein the polymerization units of monomer (a) and the polymerization units of monomer (b) are present in a mass ratio of 70.0-99.9 to 0.1-30.0, respectively.

2. The water and oil repellent composition according to claim 1, wherein the copolymer is a copolymer additionally comprising polymerization units of the following monomer (c):

Monomer (c): at least one ethylenically polymerizable monomer having no polyfluoroalkyl group other than the monomer (b), which contains at least 50 mass % of the following monomer (c1) or the following monomer (c2), based on the total amount of the monomer (c), Monomer (c1): an ethylenically polymerizable monomer which forms a homopolymer having a melting point of at least 30° C. attributable to fine crystals, Monomer (c2): an ethylenically polymerizable monomer other than the monomer (c1), which forms a homopolymer having a glass transition point of from −50° C. to 40° C.

3. The water and oil repellent composition according to claim 1, wherein the water and oil repellent composition contains at least one medium selected from the group consisting of water, an alcohol, a glycol, a glycol ether and a glycol ester.

4. The water and oil repellent composition according to claim 1, wherein Y is a bivalent organic group containing an alkylene group.

5. The water and oil repellent composition according to claim 4, wherein the bivalent organic group is represented by the formula —R$^M$-Q-R$^N$—, wherein R$^M$ and R$^N$ independently represent single bonds or saturated or unsaturated hydrocarbon groups having from 1 to 22 carbon atoms which may contain at least one oxygen atom, and Q represents a single bond, —OCONH—, —CONH—, —SO$_2$NH— or —NHCONH—.

6. The water and oil repellent composition according to claim 1, wherein the cross-linkable functional group of monomer (b) is an isocyanate group, a blocked isocyanate group, an alkoxysilyl group, an amino group, an alkoxymethylamido group, a silanol group, an ammonium group, an amido group, an epoxy group, a hydroxyl group, an oxazoline group, a carboxyl group, an alkenyl group or a sulfonic acid group.

7. The water and oil repellent composition according to claim 6, wherein the functional group is a blocked isocyanate group, an alkoxysilyl group, an amino group, an epoxy group, or an amido group.

8. The water and oil repellent composition according to claim 1, wherein monomer (b) is a (meth)acrylate, a vinyl ether or a vinyl ester.

9. The water and oil repellent composition according to claim 2, wherein monomer (c1) is present, and is a (meth)acrylate, a vinyl ester or a vinyl ether, and contains a hydrocarbon group with at least 14 carbon atoms.

10. The water and oil repellent composition according to claim 2, wherein monomer (c2) is present, and is methyl acrylate, ethyl acrylate, propyl acrylate, butyl methacrylate, cyclohexyl acrylate, 2-ethylhexyl (meth)acrylate, butyl methacrylate, n-hexyl (meth)acrylate, cyclohexyl acrylate, vinyl acetate, vinyl propionate or vinylidene chloride.

11. The water and oil repellent composition according to claim 1, wherein monomer (b) is at least one monomer selected from the group consisting of 2-isocyanatoethyl (meth)acrylate, 3-isocyanatopropyl (meth)acrylate, 4-isocyanatobutyl (meth)acrylate, the 2-butanone oxime adduct of 2-isocyanatoethyl (meth)acrylate, the pyrazole adduct of 2-isocyanatoethyl (meth)acrylate, the 3,5-dimethylpyrazole adduct of 2-isocyanatoethyl (meth)acrylate, the 3-methylpyrazole adduct of 2-isocyanatoethyl (meth)acrylate, the ϵ-caprolactam adduct of 2-isocyanatoethyl (meth)acrylate, the 2-butanone oxime adduct of 3-isocyanatopropyl (meth)acrylate, the pyrazole adduct of 3-isocyanatopropyl (meth)acrylate, the 3,5-dimethylpyrazole adduct of 3-isocyanatopropyl (meth)acrylate, the 3-methylpyrazole adduct of 3-isocyanatopropyl (meth)acrylate, the ϵ-caprolactam adduct of 3-isocyanatopropyl (meth)acrylate, the 2-butanone oxime adduct of 4-isocyanatobutyl (meth)acrylate, the pyrazole adduct of 4-isocyanatobutyl (meth)acrylate, the 3,5-dimethylpyrazole adduct of 4-isocyanatobutyl (meth)acrylate, the 3-methylpyrazole adduct of 4-isocyanatobutyl (meth)acrylate, the c-caprolactam adduct of 4-isocyanatobutyl (meth)acrylate, methoxymethyl(meth)acrylamide, ethoxymethyl(meth)acrylamide, butoxymethyl(meth)acrylamide, 3-methacryloyloxypropyltrimethoxysilane, trimethoxyvinylsilane, vinyltrimethoxysilane, dimethylaminoethyl (meth)acrylate, diethylaminoethyl (meth)acrylate, dimethylaminopropyl (meth)acrylate, (meth)acryloylmorpholine, (meth)acryloyloxyethyltrimethylammonium chloride, (meth)acryloyloxypropyltrimethylammonium chloride, (meth)acrylamidoethyltrimethylammonium chloride, (meth)acrylamidopropyltrimethylammonium chloride, t-butyl (meth)acrylamidosulfonic acid, (meth)acrylamide, N-methyl(meth)acrylamide, N-methylol(meth)acrylamide, diacetone (meth)acrylamide, glycidyl (meth)acrylate, 2-hydroxyethyl (meth)acrylate, the c-caprolactam adduct of 2-hydroxyethyl (meth)acrylate, 2-hydroxypropyl (meth)acrylate, 4-hydroxybutyl (meth)acrylate, 3-chloro-2-hydroxypropyl methacrylate, polyoxyalkylene glycol mono(meth)acrylate, (meth)acrylic acid, 2-(meth)acryloylxyethylsuccinic acid, 2-(meth)acryloylxyhexahydrophthalic acid, 2-(meth)acryloyloxyethyl acid phosphate, allyl (meth)acrylate, 2-vinyl-2-oxazoline and 2-vinyl-4-methyl-(2-vinyloxazoline).

12. The water and oil repellent composition according to claim 1, wherein monomer (a) comprises CH$_2$=CRCOOR$^f$, wherein R is H or CH$_3$, and R$^f$ is a polyfluoroalkyl group of 1-6 carbons; and monomer (b) comprises at least one of the following: a blocked isocyanate-containing monomer, glycidyl methacrylate, N-methylol(meth)acrylamide, 2-hydroxyethyl (meth)acrylate, 3-chloro-2-hydroxypropyl methacrylate, and an c-caprolactam-containing monomer.

13. The water and oil repellent composition according to claim 12, comprising a C6 Rf methacrylate as monomer (a) and 3,5-dimethylpyrazole adduct of 2-isocyanatoethyl (meth)acylate as monomer (b).

* * * * *